(12) United States Patent
Matsumoto et al.

(10) Patent No.: US 7,651,264 B2
(45) Date of Patent: Jan. 26, 2010

(54) LASER PROCESSING DEVICE, LASER PROCESSING TEMPERATURE MEASURING DEVICE, LASER PROCESSING METHOD AND LASER PROCESSING TEMPERATURE MEASURING METHOD

(75) Inventors: Satoshi Matsumoto, Hamamatsu (JP); Tsuyoshi Kosugi, Hamamatsu (JP)

(73) Assignee: Hamamatsu Photonics K.K., Hamamatsu-shi (JP)

( * ) Notice: Subject to any disclaimer, the term of this patent is extended or adjusted under 35 U.S.C. 154(b) by 145 days.

(21) Appl. No.: 10/518,392

(22) PCT Filed: Jun. 18, 2003

(86) PCT No.: PCT/JP03/07718

§ 371 (c)(1),
(2), (4) Date: Jul. 25, 2005

(87) PCT Pub. No.: WO03/106100

PCT Pub. Date: Dec. 24, 2003

(65) Prior Publication Data

US 2006/0153270 A1 Jul. 13, 2006

(30) Foreign Application Priority Data

Jun. 18, 2002 (JP) .............................. 2002-177652
Jun. 18, 2002 (JP) .............................. 2002-177662

(51) Int. Cl.
*G01J 5/08* (2006.01)
*G01N 25/00* (2006.01)

(52) U.S. Cl. ........................... 374/121; 374/130; 374/5; 374/57; 374/137; 374/141; 219/517; 219/121.46

(58) Field of Classification Search ................. 374/130, 374/120, 121, 124, 126, 137, 4–5, 57, 178, 374/131, 141; 219/130.01, 121.04, 121.83, 219/121.64, 121.85, 109–110; 250/336.1, 250/341.8, 339.06, 370.15, 559.11, 559.1, 250/215, 503.1, 472.1
See application file for complete search history.

(56) References Cited

U.S. PATENT DOCUMENTS 3,567,899 A * 3/1971 Iceland et al. .......... 219/124.34

(Continued)

FOREIGN PATENT DOCUMENTS

DE 43 42 783 6/1995

(Continued)

*Primary Examiner*—Gail Verbitsky
(74) *Attorney, Agent, or Firm*—Drinker Biddle & Reath LLP

(57) ABSTRACT

The object is to provide a laser processing apparatus, a laser processing temperature measuring apparatus, a laser processing method, and a laser processing temperature measuring method which can highly accurately detect the processing temperature when carrying out processing such as welding with laser light. A laser processing apparatus 1A for processing members. DR, UR to be processed by irradiating the members with laser light LB comprises a laser (semiconductor laser unit 20A) for generating the laser light LB; optical means for converging the laser light LB generated by the laser onto processing areas DA, UA; and a filter 30, disposed between the members DR, UR to be processed and the optical means, for blocking a wavelength of fluorescence generated by the optical means upon pumping with the laser light LB; wherein light having the wavelength blocked by the filter 30 is used for measuring a temperature of the processing areas DA, UA.

4 Claims, 18 Drawing Sheets

U.S. PATENT DOCUMENTS

| | | | |
|---|---|---|---|
| 4,484,059 A * | 11/1984 | Lillquist | 219/130.01 |
| 4,500,382 A * | 2/1985 | Foster | 156/272.8 |
| 4,854,724 A * | 8/1989 | Adams et al. | 374/5 |
| 5,275,327 A * | 1/1994 | Watkins et al. | 228/102 |
| 5,382,770 A * | 1/1995 | Black et al. | 219/121.63 |
| 5,760,379 A * | 6/1998 | Matsen et al. | 219/633 |
| 5,771,250 A * | 6/1998 | Shigehara et al. | 372/6 |
| 5,867,513 A * | 2/1999 | Sato | 372/32 |
| 5,974,069 A * | 10/1999 | Tanaka et al. | 372/46.01 |
| 6,177,649 B1 * | 1/2001 | Juret et al. | 219/121.63 |
| 6,211,983 B1 * | 4/2001 | Shiragaki | 398/180 |
| 6,399,915 B1 * | 6/2002 | Mori et al. | 219/121.83 |
| 6,417,481 B2 * | 7/2002 | Chen et al. | 219/121.6 |
| 6,585,146 B2 * | 7/2003 | Shepard | 228/104 |
| 6,839,365 B1 * | 1/2005 | Sonoda et al. | 372/22 |
| 7,153,384 B2 * | 12/2006 | Sugawara et al. | 156/272.8 |
| 7,268,866 B2 * | 9/2007 | Messler | 356/237.1 |
| 2001/0019563 A1 * | 9/2001 | Hatori | 372/21 |
| 2003/0165180 A1 * | 9/2003 | Weerasinghe et al. | 374/121 |
| 2004/0089640 A1 * | 5/2004 | Bager et al. | 219/121.64 |
| 2005/0169346 A1 * | 8/2005 | Murray et al. | 374/121 |
| 2007/0084551 A1 * | 4/2007 | Watanabe et al. | 156/272.8 |

FOREIGN PATENT DOCUMENTS

| | | |
|---|---|---|
| EP | 1063794 A2 * | 12/2000 |
| JP | 62-6789 | 1/1987 |
| JP | 60-284650 | 6/1987 |
| JP | 1-273685 | 11/1989 |
| JP | 4-50734 | 2/1992 |
| JP | 04-253588 A | 9/1992 |
| JP | 4-371381 | 12/1992 |
| JP | 05-261576 A | 10/1993 |
| JP | 5-337662 | 12/1993 |
| JP | 06-055283 A | 3/1994 |
| JP | 10-202385 | 8/1998 |
| JP | 2001-71384 | 3/2001 |
| JP | 2001071384 A * | 3/2001 |
| JP | 2002-239761 | 8/2002 |
| TW | 379154 | 5/1987 |
| TW | 453003 | 11/1988 |
| TW | 480789 | 6/1989 |
| TW | 492229 | 6/1989 |
| WO | 00/20157 | 4/2000 |

* cited by examiner

LASER PROCESSING DEVICE, LASER PROCESSING TEMPERATURE MEASURING DEVICE, LASER PROCESSING METHOD AND LASER PROCESSING TEMPERATURE MEASURING METHOD

TECHNICAL FIELD

The present invention relates to a laser processing apparatus, a laser processing temperature measuring apparatus, a laser processing method, and a laser processing temperature measuring method which are useful for measuring the temperature of a processing area when processing such as welding is carried out with laser light.

BACKGROUND ART

Techniques for carrying out various kinds of processing such as piercing, cutting, and welding by using laser light have conventionally been known. For example, Japanese Patent Publication No. HEI 5-42336 discloses a method of bonding members with laser. In this method, on a first thermoplastic resin member having a property of absorbing laser light of a YAG laser, a second thermoplastic resin member having a property of transmitting the laser light therethrough is overlaid. Then, the YAG laser irradiates the first thermoplastic resin member with the laser light by way of the second thermoplastic rein member, so as to heat and melt the first thermoplastic resin member, thereby welding the first and second thermoplastic resin members to each other.

When carrying out processing with laser light, it is important that the temperature in the processing area be controlled in order to prevent the processing from becoming defective. For detecting the temperature of the processing area, a radiation thermometer, which uses the light thermally radiating from the processing area, or the like is employed. For example, Japanese Patent Application Laid-Open No. HEI 5-261576 discloses a heat processing apparatus which regulates the surface temperature of a subject to be processed when welding the subject with laser light. In this heat processing apparatus, the light thermally radiating from the surface of the subject to be processed is divided into a plurality of light components, which are then transmitted through various filters adapted to transmit respective wavelength light components therethrough. A surface temperature is detected from the intensity ratio of various wavelength light components transmitted through the filters, and the surface temperature of the subject to be processed is controlled according to thus detected surface temperature.

DISCLOSURE OF THE INVENTION

When welding resin members to each other with laser light, however, there have been cases where the welding temperature cannot be detected accurately, and thus cannot be regulated normally, whereby defective welding has occurred. For welding with laser in particular, not only solid lasers such as YAG laser, but also semiconductor lasers with an increased output have come into use. In the case where a semiconductor laser is used for welding resin members to each other, the welding temperature cannot be detected accurately when the temperature of the welding area is detected by a radiation thermometer. The detection of the welding temperature in the welding of resin members to each other is not mentioned at all in Japanese Patent is Application Laid-Open No. HEI 5-261576.

It is therefore an object of the present invention to provide a laser processing apparatus, a laser processing temperature measuring apparatus, a laser processing method, and a laser processing temperature measuring method which can highly accurately detect the processing temperature when carrying out processing such as welding with laser light.

In one aspect, the present invention provides a laser processing apparatus for processing a member to be processed by irradiating the member with laser light, the apparatus comprising a laser for generating laser light; optical means for converging the laser light generated by the laser onto a processing area; and a filter, disposed between the member to be processed and the optical means, for blocking a wavelength of fluorescence generated by the optical means upon pumping with the laser light; wherein light having the wavelength blocked by the filter is used for measuring a temperature of the processing area.

In the fluorescence generated by the optical means, light having a wavelength which becomes an observation wavelength for measuring the processing temperature is removed by the filter in this laser processing apparatus before processing. Therefore, a fluorescence component having a wavelength identical to the observation wavelength generated by the optical means does not radiate from the processing area. Hence, when a light component having the wavelength removed by the filter in light thermally radiating from the processing area is used, the temperature of the processing area can accurately be detected without being affected by noise light caused by the fluorescence of the optical means.

In another aspect, the present invention provides a laser processing apparatus for processing a member to be processed by irradiating the member with laser light, the apparatus comprising a laser for generating laser light; first optical means for converging the laser light generated by the laser onto a processing area; and second optical means, disposed between the member to be processed and the first optical means, for blocking a wavelength of fluorescence generated by the optical means upon pumping with the laser light; wherein light having the wavelength blocked by the second optical means is used for measuring a temperature of the processing area.

In the fluorescence generated by the first optical means, light having a wavelength which becomes an observation wavelength for measuring the processing temperature is removed by a coating applied to the second optical means for suppressing the reflection loss or the like in this laser processing apparatus before processing. Therefore, a fluorescence component having a wavelength identical to the observation wavelength generated by the first optical means does not radiate from the processing area. Hence, when a light component having the wavelength removed by the second optical means in light thermally radiating from the processing area is used, the temperature of the processing area can accurately be detected without being affected by noise light caused by the fluorescence of the first optical means.

The laser processing apparatus in accordance with the above-mentioned aspects of the present invention may be configured such that the filter or second optical means blocks a wavelength other than an oscillation wavelength of the laser light.

Since this laser processing apparatus totally removes light having a wavelength other than the oscillation wavelength unnecessary for processing in the fluorescence generated by the optical means before the processing, the light radiating from the processing area does not include the fluorescence generated by the optical means at all.

In still another aspect, the present invention provides a laser processing temperature measuring apparatus for measuring the temperature of the processing area being processed by the above-mentioned laser processing apparatus, the measuring apparatus comprising temperature detecting means for detecting the temperature according to a light component having the wavelength blocked by the filter or second optical means in light thermally radiating from the processing area.

This laser processing temperature measuring apparatus can detect the processing temperature with a high accuracy, since the temperature detecting means can detect the processing temperature by using thermally radiating light without any mingling noise light (part or whole of fluorescence) generated by the optical means as light having the observation wavelength.

In still another aspect, the present invention provides a laser processing method for processing a member to be processed by irradiating the member with laser light; the method comprising a laser light generating step of generating laser light; a light-converging step of causing an optical system to converge the laser light generated by the laser light generating step onto a processing area; and a fluorescence blocking step of causing a filter to block a wavelength of fluorescence generated by the optical system upon pumping with the laser light before processing; wherein light having the wavelength blocked by the fluorescence blocking step is used for measuring a temperature of the processing area.

In the fluorescence generated by the optical system, light having a wavelength which becomes an observation wavelength for measuring the processing temperature is removed by the filter in this laser processing method before processing, whereby the temperature of the processing area can accurately be detected according to thermally radiating light free of noise light mingling therein.

In still another aspect, the present invention provides a laser processing method for processing a member to be processed by irradiating the member with laser light; the method comprising a laser light generating step of generating laser light; a light-converging step of causing a first optical system to converge the laser light generated by the laser light generating step onto a processing area; and a fluorescence blocking step of causing a second optical system to block a wavelength of fluorescence generated by the first optical system upon pumping with the laser light before processing; wherein light having the wavelength blocked by the fluorescence blocking step is used for measuring a temperature of the processing area.

In the fluorescence generated by the first optical system, light having a wavelength which becomes an observation wavelength for measuring the processing temperature is removed by a coating applied to the second optical means for suppressing the reflection loss or the like in this laser processing method before processing, whereby the temperature of the processing area can accurately be detected according to thermally radiating light free of noise light mingling therein.

In still another aspect, the present invention provides a laser processing temperature measuring method for measuring the temperature of the processing area being processed by the laser processing method in accordance with the above-mentioned aspects, the measuring method comprising a temperature detecting step of detecting the temperature according to a light component having the wavelength blocked by the fluorescence blocking step in light thermally radiating from the processing area.

This laser processing temperature measuring method can detect the processing temperature with a high accuracy, since the processing temperature can be detected by using thermally radiating light without any mingling noise light (part or whole of fluorescence) generated by the optical system as light having the observation wavelength.

In still another aspect, the present invention provides a laser processing apparatus for welding resin members to each other by using laser light, the apparatus comprising a semiconductor laser for generating laser light; and a filter, disposed between the semiconductor laser and the resin members, for blocking light having a wavelength to become an observation wavelength for measuring a temperature of a welding area in the light generated by the semiconductor laser; wherein light having the wavelength blocked by the filter is used for measuring the temperature of the welding area.

In the light generated by the semiconductor laser, a light component having a wavelength which becomes an observation wavelength for measuring the welding temperature is removed by the filter before welding in this laser processing apparatus. Therefore, a light component having a wavelength identical to the observation wavelength generated by the semiconductor laser does not radiate from the welding area (processing area). Hence, when a light component having the wavelength removed by the filter in the light thermally radiating from the welding area is used, the temperature of the welding area (processing temperature) can accurately be detected without being affected by noise light caused by the semiconductor laser.

In still another aspect, the present invention provides a laser processing apparatus for welding resin members to each other by using laser light, the apparatus comprising a semiconductor laser for generating laser light; and optical means for converging the laser light generated by the semiconductor laser onto a welding area and blocking light having a wavelength to become an observation wavelength for measuring a temperature of the welding area in the light generated by the semiconductor laser; wherein light having the wavelength blocked by the optical means is used for measuring the temperature of the welding area.

In the light generated by the semiconductor laser, a light component having a wavelength which becomes an observation wavelength for measuring the welding temperature is removed by a coating applied to the optical means for suppressing the reflection loss or the like before welding in this laser processing apparatus. Therefore, a light component having a wavelength identical to the observation wavelength generated by the semiconductor laser does not radiate from the welding area. Hence, when a light component having the wavelength removed by the optical means in the light thermally radiating from the welding area is used, the temperature of the welding area can accurately be detected without being affected by noise light caused by the semiconductor laser.

The laser processing apparatus in accordance with the above-mentioned aspects of the present invention may be configured such that the filter or optical means blocks light having a wavelength other than an oscillation wavelength of the semiconductor laser.

Since this laser processing apparatus totally removes the light component having a wavelength other than the oscillation wavelength unnecessary for welding in the light generated by the semiconductor laser, the light radiating from the welding area does not include light other than the oscillation wavelength generated by the semiconductor laser at all.

The laser processing apparatus in accordance with the above-mentioned aspects of the present invention may be configured such that the filter or optical means blocks light having a wavelength falling within the range of 1100 nm to 2800 nm.

This laser processing apparatus removes light having a wavelength falling within the range of 1100 nm to 2800 nm, which is a wavelength range suitable for detecting the welding temperature in the light generated from the semiconductor laser, before welding, whereby the light radiating from the welding area does not include any noise light for detecting the welding temperature generated by the semiconductor laser. Here, the welding temperature detected by light having a wavelength shorter than 1100 nm is hard to weld the welding members to each other. On the other hand, light having a wavelength longer than 2800 nm cannot be transmitted through the resin members, and thus cannot be used for detecting the welding temperature when welding the resin members to each other in a stacked fashion.

In still another aspect, the present invention provides a laser processing temperature measuring apparatus for measuring the temperature of the welding area being welded by the laser processing apparatus in accordance with the above-mentioned aspects of the present invention, the measuring apparatus comprising temperature detecting means for detecting the temperature according to a light component having the wavelength blocked by the filter or optical means in light thermally radiating from the welding area.

This laser processing temperature measuring apparatus can detect the welding temperature (processing temperature) with a high accuracy, since the temperature detecting means can detect the processing temperature by using thermally radiating light without any mingling noise light (part or whole of light other than the oscillation wavelength) generated by the semiconductor laser as light having the observation wavelength.

In still another aspect, the present invention provides a laser processing method for welding resin members to each other by using laser light, the method comprising a laser light generating step of causing a semiconductor laser to generate laser light; and a filtering step of blocking light having a wavelength to become an observation wavelength for measuring a temperature of a welding area in the light generated by the laser light generating step with a filter before welding; wherein light having the wavelength blocked by the filtering step is used for measuring the temperature of the welding area.

In the light generated by the semiconductor laser, a light component having a wavelength which becomes an observation wavelength for measuring the welding temperature is removed by the filter before welding in this laser processing method, whereby the temperature of the welding area can accurately be detected according to thermally radiating light free of noise light mingling therein.

In still another aspect, the present invention provides a laser processing method for welding resin members to each other by using laser light, the method comprising a laser light generating step of causing a semiconductor laser to generate laser light; and a filtering step of blocking light having a wavelength to become an observation wavelength for measuring a temperature of a welding area in the light generated by the laser light generating step with an optical system adapted to converge the laser light generated by the laser light generating step onto the welding area; wherein light having the wavelength blocked by the filtering step is used for measuring the temperature of the welding area.

In the light generated by the semiconductor laser, a light component having a wavelength which becomes an observation wavelength for measuring the welding temperature is removed by a coating applied to the optical system for suppressing the reflection loss or the like in this laser processing method before welding, whereby the temperature of the welding area can accurately be detected according to thermally radiating light free of noise light mingling therein.

In still another aspect, the present invention provides a laser processing temperature measuring method for measuring the temperature of the welding area being welded by the laser processing method in accordance with the above-mentioned aspects of the present invention, the measuring method comprising a temperature detecting step of detecting the temperature according to a light component having the wavelength blocked by the filtering step in light thermally radiating from the welding area.

This laser processing temperature measuring method can detect the welding temperature with a high accuracy, since it can detect the welding temperature by using thermally radiating light without any mingling noise light (part or whole of light other than the oscillation wavelength) generated by the semiconductor laser as light having the observation wavelength.

BEST MODES FOR CARRYING OUT THE INVENTION

Figure 1:
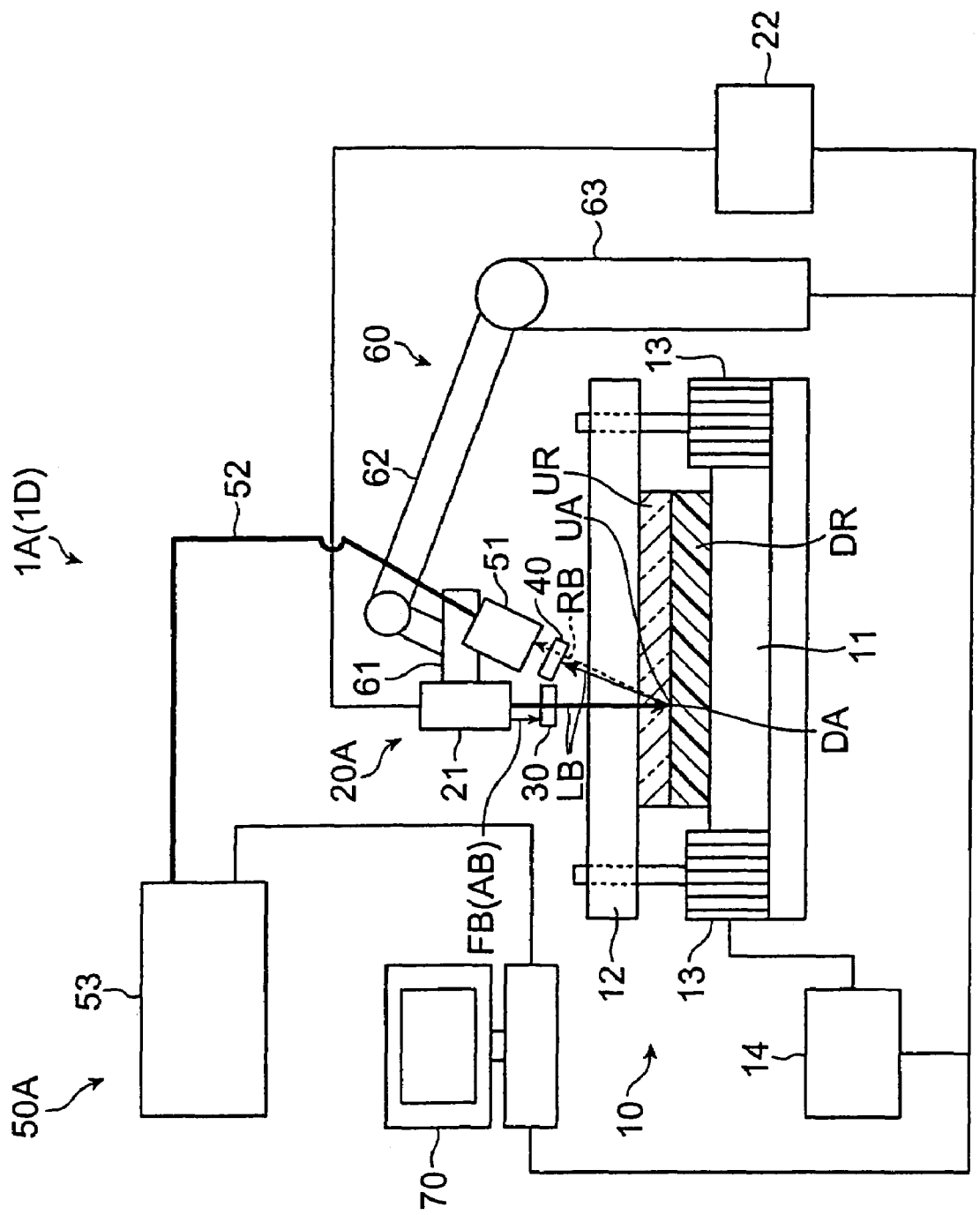
FIG. 1 is an overall diagram of the resin welding apparatus in accordance with first and fourth embodiments of the present invention.

In the following, embodiments of the laser processing apparatus, laser processing temperature measuring apparatus, laser processing method, and laser processing temperature measuring method in accordance with the present invention will be explained with reference to the drawings.

For highly accurately detecting the processing temperature when carrying out various kinds of processing with laser, the present invention prevents noise light from mingling into light thermally radiating from a processing area.

In one aspect, the present invention finds out that there is a case where the noise light includes fluorescence generated by an optical system for converging laser light, and removes a light component having a wavelength to become an observation wavelength for detecting the processing temperature in the fluorescence generated by the optical system before processing. To this aim, the present invention uses a filter or (a coating or the like of) an optical system such as a condenser lens for laser, so as to block light having the wavelength to become the observation wavelength.

In another aspect, the present invention finds out that there is a case where the noise light includes a light component other than an oscillation wavelength generated by a semiconductor laser, and removes a light component having a wavelength to become an observation wavelength for detecting a welding temperature in light generated by the semiconductor laser before welding. To this aim, the present invention uses a filter or an optical system such as a condenser lens for laser, so as to block light having the wavelength to become the observation wavelength.

In an embodiment, the present invention is employed in a resin welding apparatus for welding resin members to each other in a stacked fashion by using laser light. The resin welding apparatus in accordance with this embodiment comprises a semiconductor laser unit for emitting laser light and a resin temperature measuring apparatus for detecting a welding temperature of a welding area, and controls the welding temperature according to the welding temperature detected by the resin temperature measuring apparatus.

First to third embodiments relate to cases where the noise light includes fluorescence generated by the optical system for converging the laser light. In the first and second embodiments, the fluorescence generated by optical means of the semiconductor laser unit is cut by a cut filter. In particular, the first embodiment uses a semiconductor laser unit of direct focusing type, whereas the second embodiment uses a semiconductor laser unit of fiber-out type. In the third embodiment, a coating applied to a condenser lens of a semiconductor laser unit (of direct focusing type) partly cuts the fluorescence.

Fourth to sixth embodiments relate to cases where the noise light includes a light component other than an oscillation wavelength generated by a semiconductor laser. In the fourth and fifth embodiments, the light component other than the oscillation wavelength generated by the semiconductor laser unit is cut by a cut filter. In particular, the fourth embodiment uses a semiconductor laser unit of direct focusing type, whereas the fifth embodiment uses a semiconductor laser unit of fiber-out type. In the sixth embodiment, a coating applied to a condenser lens of a semiconductor laser unit (of direct focusing type) partly cuts the fluorescence.

FIRST EMBODIMENT

Initially, the first embodiment will be explained. With reference to FIG. 1, the configuration of a resin welding apparatus 1A will be explained. FIG. 1 is an overall diagram of the resin welding apparatus 1A in accordance with the first embodiment.

The resin welding apparatus 1A is an apparatus which controls the welding temperature so as to make it fall within a reference temperature range, and welds an upper resin member UR (e.g., acrylic resin) and a lower resin member DR (e.g., ABS resin), which are members to be welded, to each other in a stacked fashion while pressing them. To this aim, the resin welding apparatus 1A comprises a pressure applying unit 10, a semiconductor laser unit 20A, a first cut filter 30, a second cut filter 40, a resin temperature measuring unit 50A, a robot arm unit 60, and a control unit 70.

The upper resin member UR has a property of transmitting therethrough laser beams LB having an oscillation wavelength of the semiconductor laser unit 20A. On the other hand, the lower resin member DR has a property of absorbing the laser beams LB having the oscillation wavelength of the semiconductor laser unit 20A. Therefore, in the resin welding apparatus 1A, the laser beams LB emitted from the semiconductor laser unit 20A are transmitted through the upper resin member UR, and are absorbed by an area (welding area) DA to be welded to the upper resin member UR in the surface of the lower resin member DR. This absorption heats and melts the welding area DA. This heat melts an area (welding area) UA to be welded in the surface of the upper resin member UR, whereby the upper resin member UR and the lower resin member DR are welded to each other.

The pressure applying unit 10 presses the upper resin member UR and lower resin member DR. When melting the welding area DA by heating, the heat will be hard to conduct to the welding area UA if a gap exists between the welding regions DA and UA. As a consequence, defective welding may occur.

Therefore, the pressure applying unit 10 presses the welding areas DA and UA to each other so as to bring them, into close contact with each other.

The pressure applying unit 10 comprises a base plate 11, a pressure plate 12, regulators 13, 13, and a controller 14. The lower resin member DR is mounted on the upper face of the base plate 11, whereas the upper resin member UR is mounted on the upper face of the lower resin member DR. The pressure plate 12 is constructed by a material adapted to transmit the laser beam LB therethrough, and is disposed above the base plate 11. The pressure plate 12 presses the lower resin member DR and resin member UR stacked on the base plate 11. The regulators 13, 13 move the pressure plate 12 up and down according to a control signal from the controller 14, thereby regulating the distance between the base plate 11 and pressure plate 12. According to an instruction signal from the control unit 70, the controller 14 sends a control signal for controlling the pressure so as to make it fall within a reference pressure range.

Figure 2:
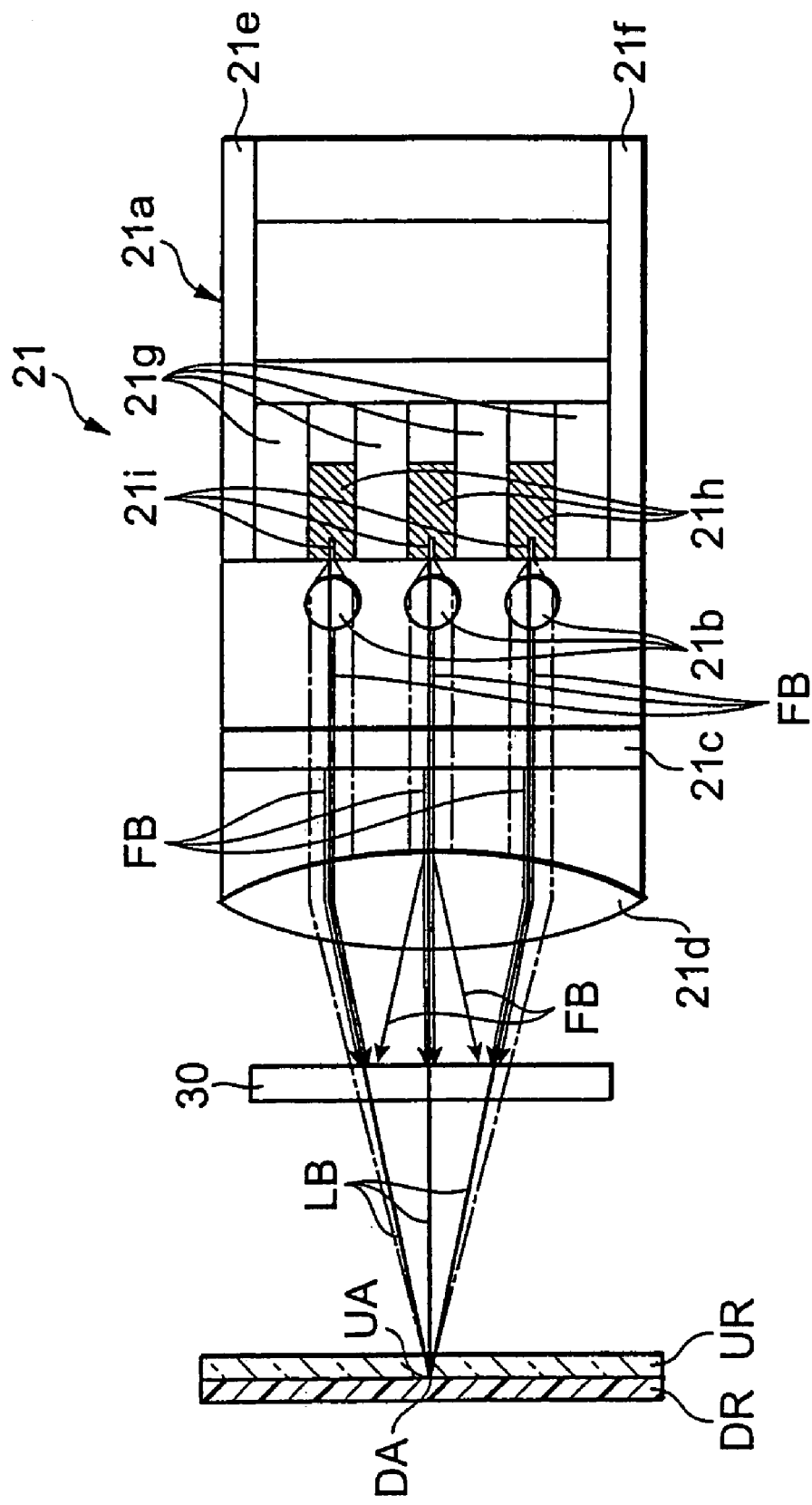
FIG. 2 is a side view of the semiconductor laser unit and first cut filter in the resin welding apparatus in accordance with the first embodiment.

With reference to FIG. 2 as well, the semiconductor laser unit 20A will be explained. FIG. 2 is a side view of the semiconductor laser unit 20A and first cut filter 30.

The semiconductor laser unit 20A irradiates the welding area DA with the laser beams LB (having an oscillation wavelength of 810 nm), so as to heat and melt the upper resin member UR and lower resin member DR. To this aim, the semiconductor laser unit 20A comprises a main unit 21 and a controller 22. The main unit 21 generates the laser beam LB according to a control signal from the controller 22, converges thus generated laser beams LB, and emits them toward the welding area DA. According to instruction signals from the control unit 70, the controller 22 sends control signals for regulating irradiation conditions (intensity, focus diameter, etc.) to the main unit 21.

The main unit 21 comprises a semiconductor laser 21a, first collimating lenses 21b, . . . , a second collimating lens 21c, and a condenser lens 21d. The semiconductor laser 21a includes planar electrodes 21e, 21f, whereas a plurality of laser arrays 21h, . . . are laminated between the planar electrodes 21e, 21f by way of heat sinks 21g, . . . , so as to form a laser array stack. Each laser array 21h has a structure in which a plurality of laser light emission points 21i, . . . are arranged in a row, whereas the laser light emission points 21i, . . . emit the respective laser beams LB. The first collimating lenses 21b, second collimating lens 21c, and condenser lens 21d act as optical means for converging the laser beams LB generated by the semiconductor laser 21a onto the welding area DA.

For each laser array 21h, the first collimating lens 21b is arranged in front of the laser array 21h in the emitting direction of the laser beam LB while in parallel with the laser array 21h. The first collimating lens 21b is a cylindrical lens, and converges the respective laser beams LB emitted from the laser light emission points 21i of the laser array 21h into the latitudinal direction of the laser array 21h (i.e., the direction in which the laser light emission points 21i of the semiconductor laser 21a are arranged).

For each row of the laser light emission points 21i, . . . in the laminating direction of the lens arrays 21h, . . . , the second collimating lens 21c is arranged in front of the first collimating lenses 21b, . . . in the emitting direction of the laser beam LB while in parallel with the laser emission points 21i, . . . arranged in a row in the laminating direction of the laser arrays 21h, . . . . The second collimating lens 21c is a columnar convex lens, and converges the respective laser beams LB emitted from the laser light emission points 21i into the longitudinal directions of the laser arrays 21h.

The condenser lens 21d is disposed in front of the second collimating lens 21c in the emitting direction of the laser beams LB. The condenser lens 21d has a predetermined focal length, and converges parallel light onto a focal point (welding area DA).

The main unit 21 generates a voltage between the planar electrodes 21e, 21f according to a control signal from the controller 22, and emits the respective laser beams LB from the laser light emission points 21i according to this voltage. In the main unit 21, the laser beams LB emitted from the laser light emission points 21i are turned into parallel beams with respect to the latitudinal directions of the laser arrays 21h by the first collimating lenses 21b, and then are turned into parallel beams with respect to the longitudinal directions of the laser arrays 21h by the second collimating lens 21c. Finally, in the main unit 21, the laser beams LB turned into parallel light are converged onto the welding area DA by the condenser lens 21d.

As in the foregoing, the semiconductor laser unit 20A is a high-output laser unit which emits a number of laser beams LB from the respective laser light emission points 21i and collects the laser beams LB. The semiconductor laser unit 20A is of direct focusing type in which the main unit 21 converges the laser beams. LB and directly emits them to the welding area DA. In the semiconductor laser unit 20A, the vertical position of the main unit 21 is movable by the robot arm unit 60, so that the focal position of the laser beams LB is adjusted. Also, in the semiconductor laser unit 20A, the horizontal position of the main unit 21 is movable by the robot arm unit 60, so that the welding speed and welding position are adjusted.

Figure 3:
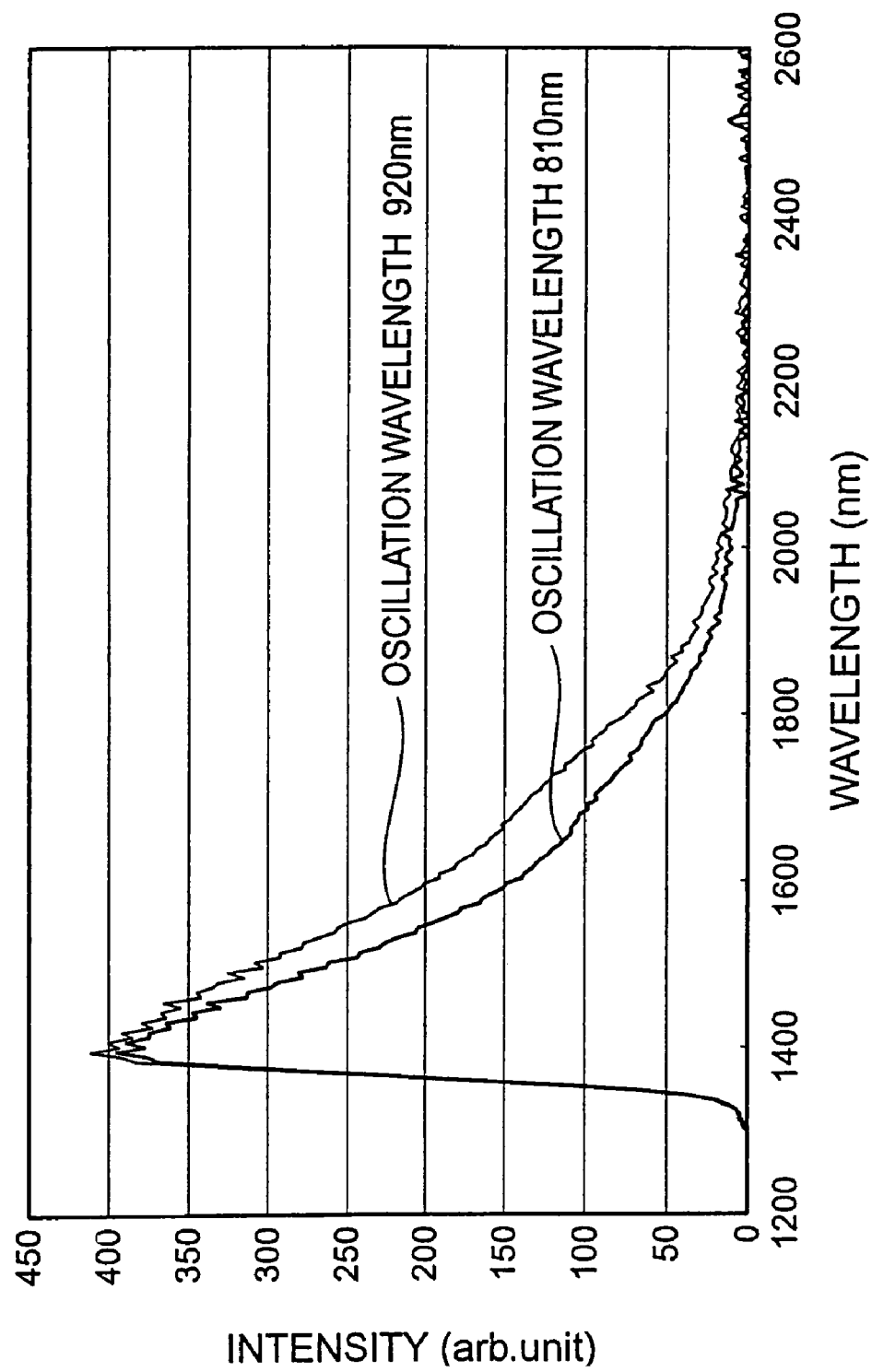
FIG. 3 is a chart showing relationships between the wavelength and intensity of noise light emitted from semiconductor laser units.

Here, the facts elucidated by experiments about the semiconductor laser unit will be explained with reference to FIG. 3. FIG. 3 is a chart showing relationships between the wavelength and intensity of additional light (fluorescence here) emitted from semiconductor laser units. In the drawings and specification, "additional light" refers to light components other than the oscillation wavelength of the semiconductor laser in the light generated by each semiconductor laser unit.

A semiconductor laser unit is configured so as to emit laser light having a single oscillation wavelength (e.g., 810 nm). However, various experiments have elucidated that the semiconductor laser unit emits additional light as well. FIG. 3, whose abscissa and ordinate indicate wavelength and light intensity, respectively, shows intensity vs. wavelength characteristics of additional light components emitted from respective semiconductor laser units having oscillation wavelengths of 810 nm and 920 nm. As can be seen from FIG. 3, each semiconductor laser unit emits additional light (infrared light) from 1300 nm to 2100 nm on the longer wavelength side of the oscillation wavelength regardless of where the oscillation wavelength is. The intensity of this additional light drastically increases from near 1300 nm to near 1400 nm and gradually decreases from near 1400 nm. The intensity of the additional light is lower than that of the laser light having the oscillation wavelength by at least 6 digits.

Figure 6:
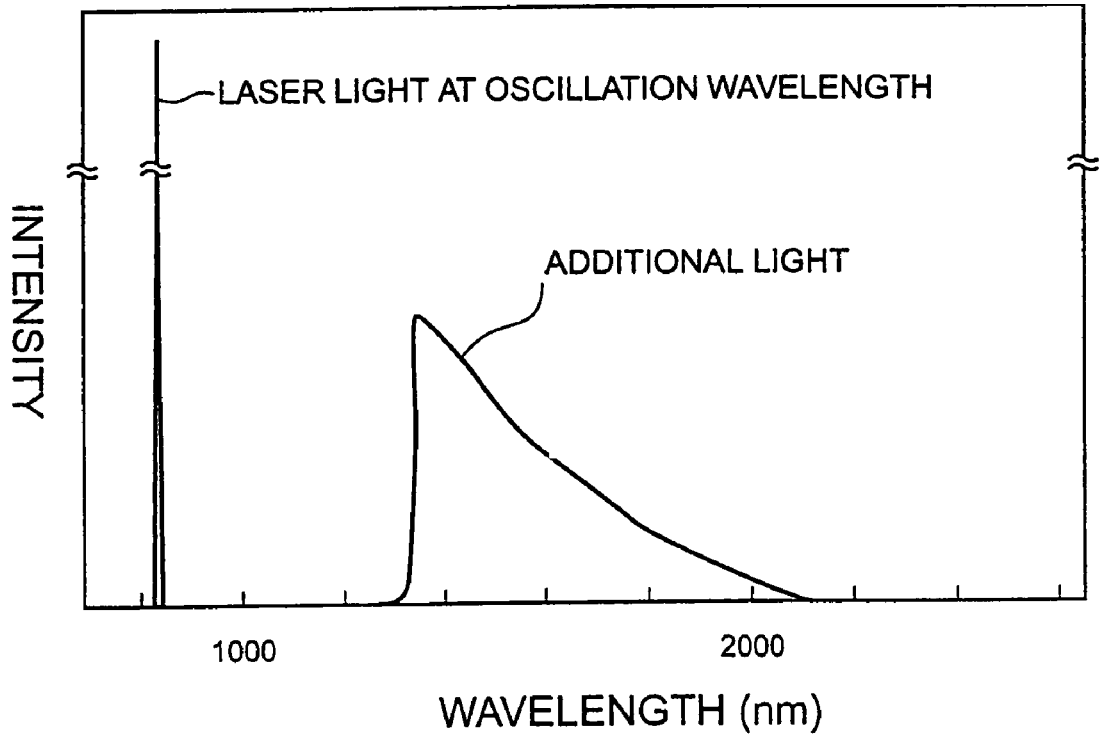
FIG. 6 is a chart showing relationships between wavelength and intensity in laser light having an oscillation wavelength and additional light emitted from the semiconductor laser unit shown in FIG. 1.

One of reasons why a semiconductor laser unit emits additional light is the generation of fluorescence in optical means such as first and second collimating lenses and a condenser lens in the semiconductor laser unit. This is because these optical means absorb the laser light emitted by the semiconductor laser and thus attain an excited state, thereby generating fluorescence having a wavelength longer than the oscillation wavelength of the laser light. For example, the semiconductor laser unit 20A in accordance with the first embodiment emits the laser beams LB having an oscillation wavelength (810 nm) and fluorescence, which is additional light, as shown in FIG. 6. FIG. 6, whose abscissa and ordinate indicate the wavelength and intensity of light, respectively, is a chart showing relationships between wavelength and intensity in laser light having an oscillation wavelength and additional light (fluorescence here) emitted from the semiconductor laser unit.

Figure 4:
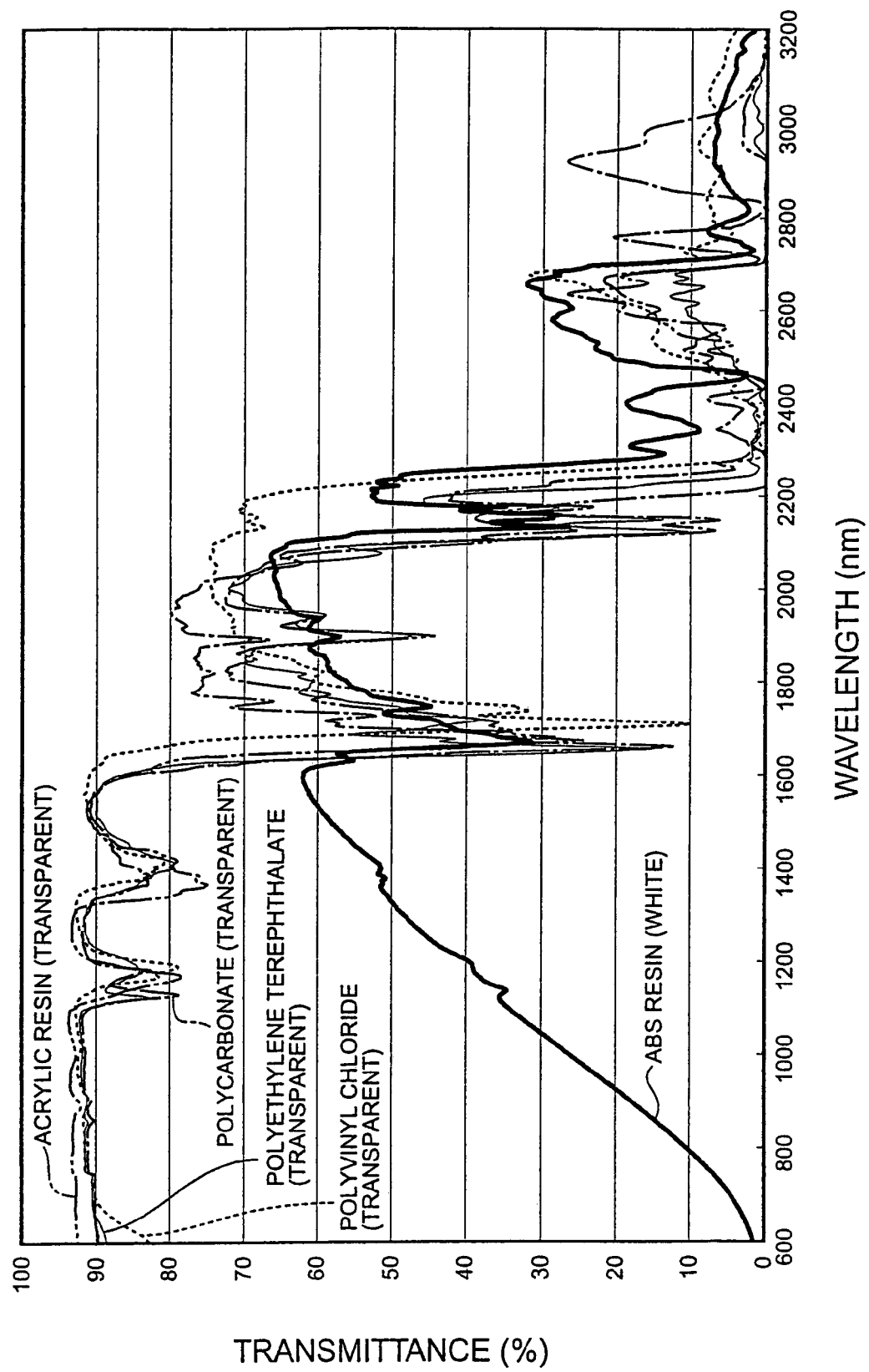
FIG. 4 is a chart showing relationships between the wavelength of light and the transmittance of light in the resin members when the resin members are irradiated with light.

With reference to FIG. 4, characteristics of resin members will also be explained. FIG. 4 is a chart showing relationships between the wavelength of light and the transmittance of light in the resin members when the resin members are irradiated with light.

FIG. 4, whose abscissa and ordinate indicate the wavelength of light irradiating the resin members and the transmittance of light in the resin members, respectively, shows respective characteristics of five resin members, i.e., ABS resin (white), polyvinyl chloride (transparent), polyethylene terephthalate (transparent), polycarbonate (transparent), and acrylic resin (transparent). As can be seen from FIG. 4, each of the five resin members has a property of hardly transmitting therethrough light having a wavelength longer than 2800 nm. Therefore, radiation thermometers cannot use the thermally radiating light having a wavelength longer than 2800 nm for detecting the welding temperature in stacked welding, since they detect the welding temperature by using thermally radiating light transmitted through the upper resin member.

When welding resin members to each other, the welding temperature is as low as 200° to 400° C., whereby it is necessary to use thermally radiating light having a wavelength longer than 1100 nm in order for a radiation thermometer to detect the welding temperature from thermally radiating light having a low temperature of about 200° C. Therefore, when detecting the welding temperature in stacked welding, it is necessary for the radiation thermometer to use a wavelength within the range of 1100 nm to 2800 nm as an observation wavelength.

Figure 5:
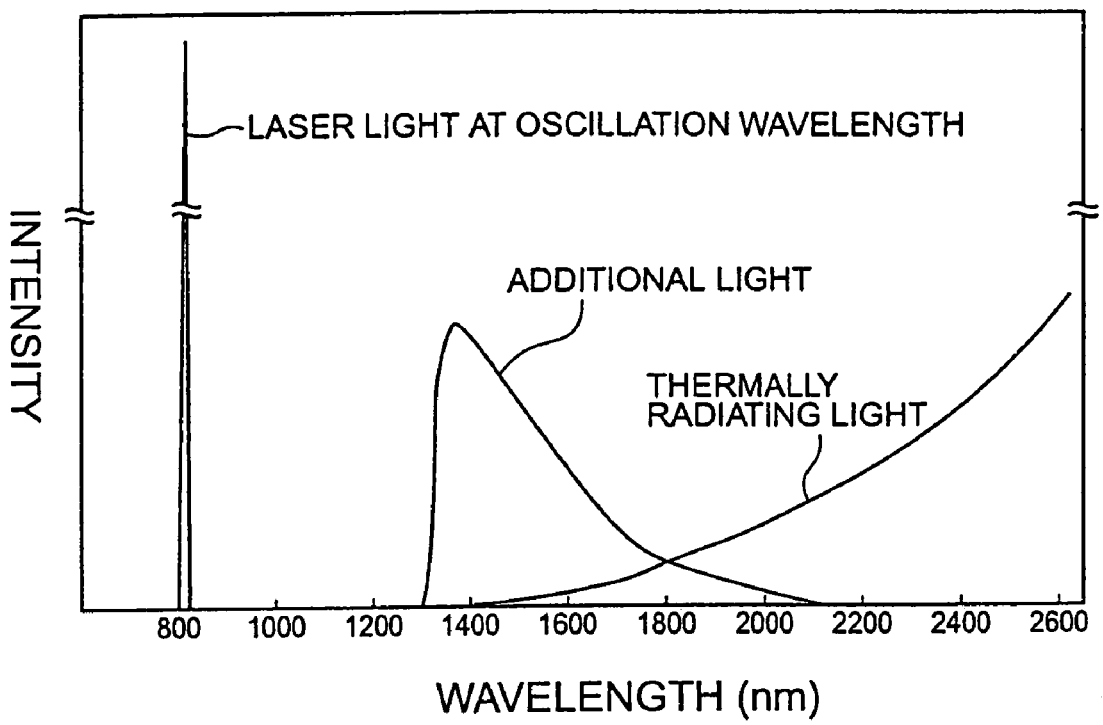
FIG. 5 is a chart showing relationships between wavelength and intensity in laser light having an oscillation wavelength and additional light emitted from a semiconductor laser unit, and thermally radiating light generated by a welding area.

With reference to FIG. 5, the relationship between the wavelengths of thermally radiating light and additional light and the observation wavelength in the case where stacked welding is carried out by a semiconductor laser unit will also be explained. FIG. 5 is a chart showing relationships between wavelength and intensity in laser light having an oscillation wavelength and additional light (fluorescence here) emitted from the semiconductor laser unit, and thermally radiating light generated by a welding area.

FIG. 5, whose abscissa and ordinate indicate the wavelength and intensity of light, respectively, shows respective characteristics of the laser light having the oscillation wavelength (810 nm), fluorescence which is the additional lights and thermally radiating light. As can be seen from FIG. 5, the fluorescence and the thermally radiating light have respective output characteristics overlapping each other within the wavelength range of 1400 nm to 2100 nm The intensity of fluorescence is lower than that of the above-mentioned laser light having the oscillation wavelength by at least 6 digits. When welding resin members to each other, the welding temperature is low, whereby the intensity of thermally radiating light is so low as to be influenced by the fluorescence. When welding resin members to each other in a stacked fashion, a wavelength within the range of 1100 nm to 2800 nm is used as the observation wavelength of the radiation thermometer as mentioned above. Therefore, when detecting the welding temperature in stacked welding of the resin members to each other, it seems that the radiation thermometer has conventionally been incapable of accurately detecting the welding temperature from the thermally radiating light, since the fluorescence, which is additional light emitted from the semiconductor laser unit, becomes noise light for the thermally radiating light as well.

Hence, no noise light will mingle into the thermally radiating light if the light having the observation wavelength used for detecting temperature in the radiation thermometer in the fluorescence generated by the semiconductor laser unit is removed before welding. In this case, noise light can reliably be excluded if the fluorescence is totally removed or light falling within the observation wavelength range of the radiation thermometer, i.e., 1100 nm to 2800 nm, is removed.

Figure 7:
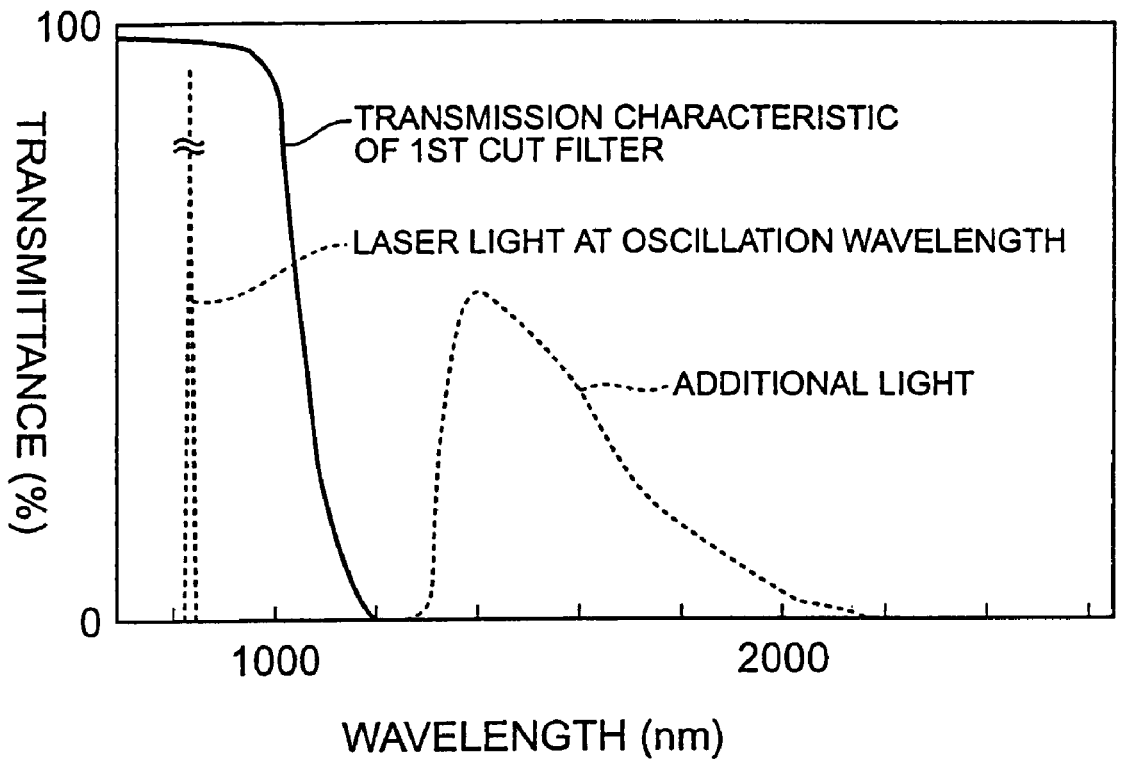
FIG. 7 is a chart showing the relationship between wavelength and transmittance as a characteristic of the first cut filter shown in FIG. 1.
Figure 8:
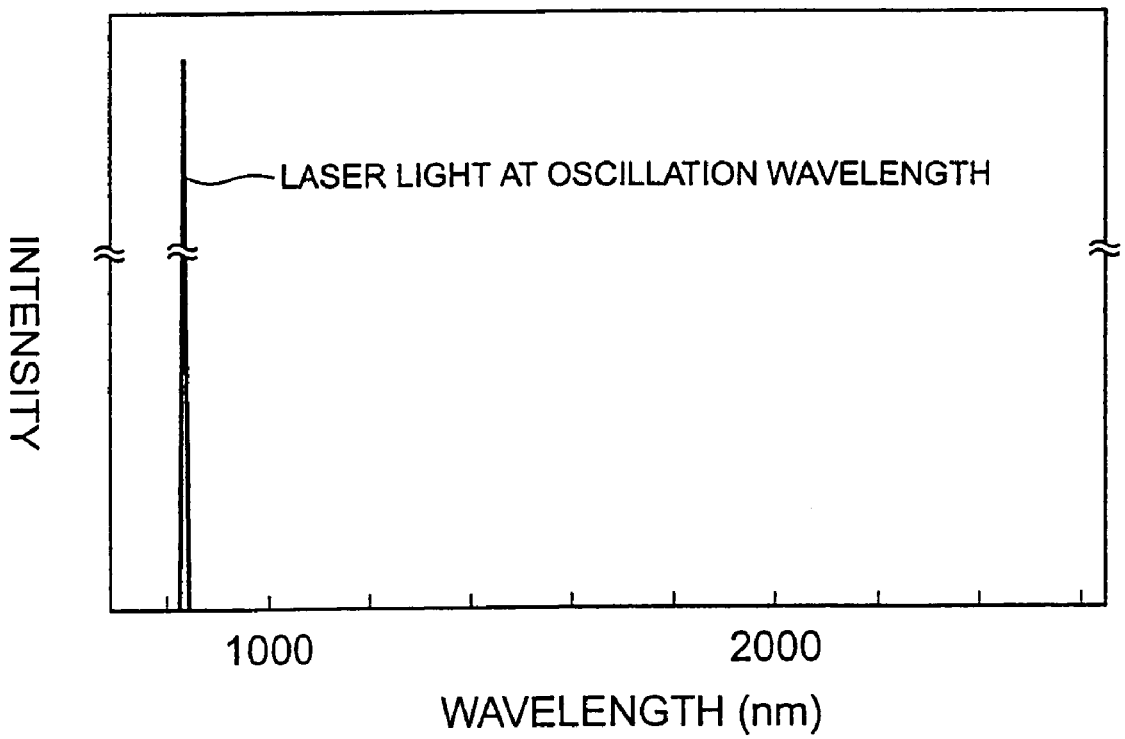
FIG. 8 is a chart showing the relationship between wavelength and intensity of light obtained after the light emitted from the semiconductor laser unit shown in FIG. 1 is transmitted through the first cut filter.

Returning to the explanation of the configuration of the resin welding apparatus 1A, the first cut filter 30 will be explained with reference to FIGS. 2, 7, and 8 as well. FIG. 7 is a chart showing the relationship between wavelength and transmittance as a characteristic of the first cut filter 30. FIG. 8 is a chart showing the relationship between wavelength and intensity of light obtained after the light emitted from the semiconductor laser unit 20A is transmitted through the first cut filter 30.

The first cut filter 30 is a filter which totally cuts fluorescent beams FB emitted from the semiconductor laser unit 20A before welding. FIG. 7, whose abscissa and ordinate indicate wavelength and transmittance, respectively, shows a transmission characteristic (solid line) of the first cut filter 30. As can be seen from FIG. 7, the first cut filter 30 has a property of transmitting therethrough light having a wavelength shorter than 1200 nm (i.e., a property of totally blocking noise light) in order to transmit therethrough the laser beams LB having the oscillation wavelength of 810 nm and block the fluorescent beams FB acting as additional light. When the laser beams LB and fluorescent beams FB emitted from the semiconductor laser unit 20A enter the first cut filter 30 having such a property, only the laser beams LB having the oscillation wavelength are transmitted therethrough as shown in FIG. 8. In FIG. 8, the abscissa and ordinate indicate the wavelength and intensity of light, respectively.

The first cut filter 30 is disposed at a position between the main unit 21 of the semiconductor laser unit 20A and the upper resin member UR, where the laser beams LB and fluorescent beams FB pass, and is configured so as to be movable as the main unit 21 moves. In this movable configuration, the first cut filter 30 may be moved together with the main unit 21 by the robot arm unit 60.

It will be sufficient for the first cut filter 30 to have a role of partly or wholly blocking the wavelength range of fluorescent beams FB emitted from the semiconductor laser unit 20A before welding. Therefore, the first cut filter 30 may be disposed not only on the outside of the semiconductor laser unit 20A separately therefrom, but also within the semiconductor laser unit 20A as long as it is positioned closer to the welding areas DA, UA than is the optical means partly or wholly generating the wavelength range of fluorescent beams FB. Preferably, the first cut filter 30 is disposed at a position where the luminous flux of laser beams LB is widened (energy density is lower) This is because the semiconductor laser unit 20A has such a high output that the energy density is higher at a position where the laser beams LB are converged, whereby the first cut filter 30 is damaged by heat.

Figure 9:
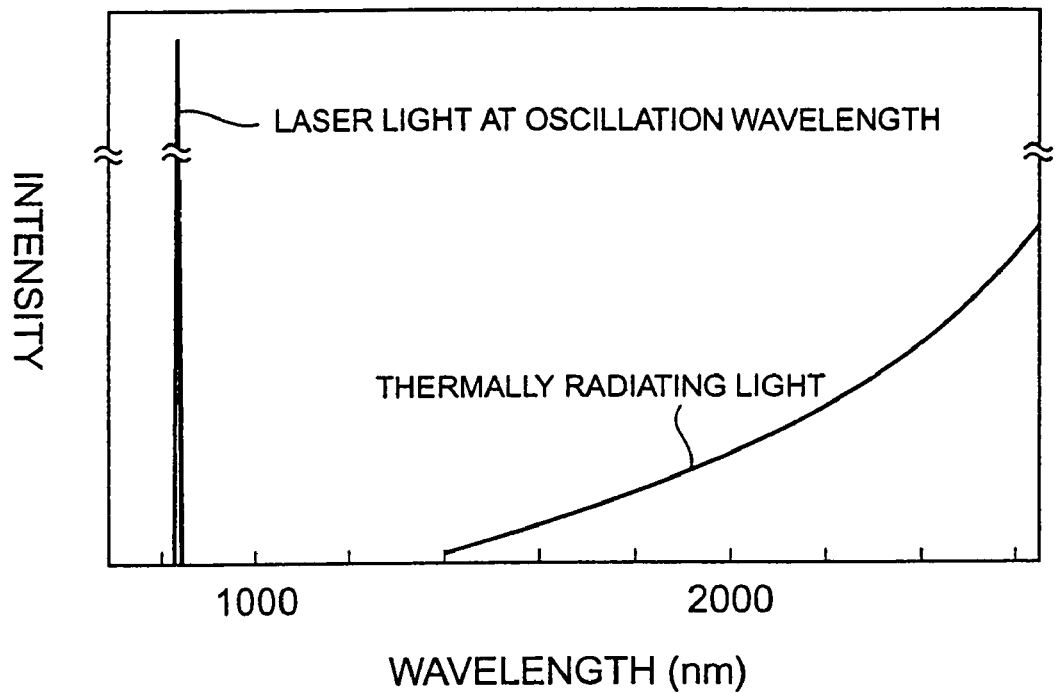
FIG. 9 is a chart showing the relationship between wavelength and intensity of light radiating from the welding areas shown in FIG. 1.
Figure 10:
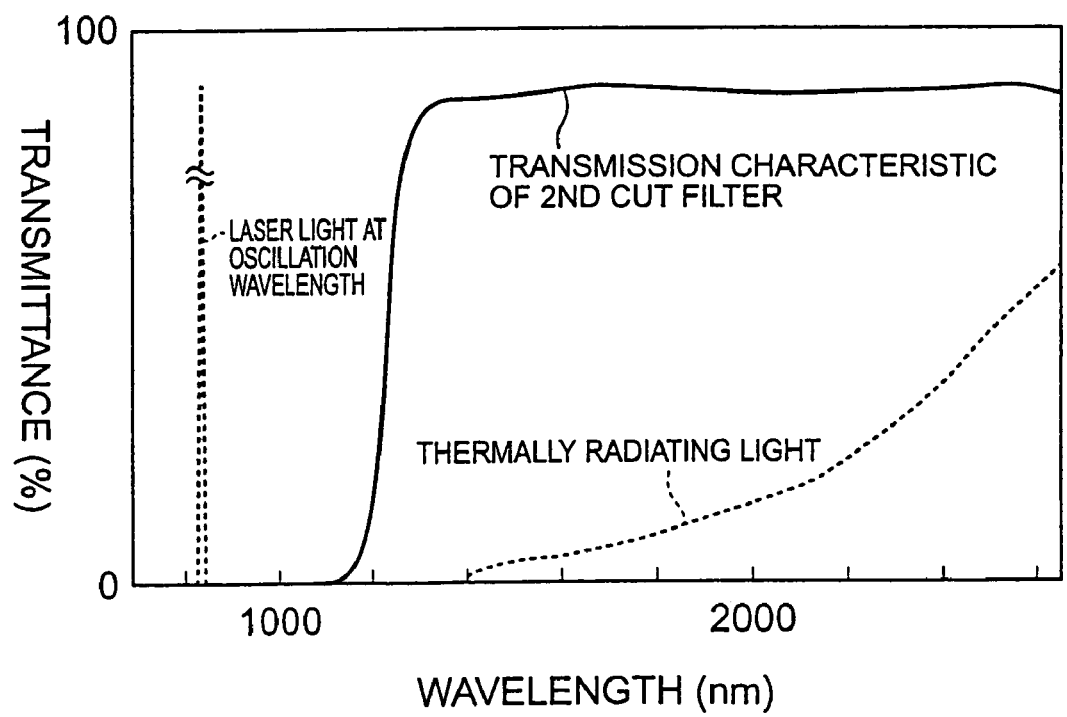
FIG. 10 is a chart showing the relationship between wavelength and transmittance as a characteristic of the second cut filter shown in FIG. 1.
Figure 11:
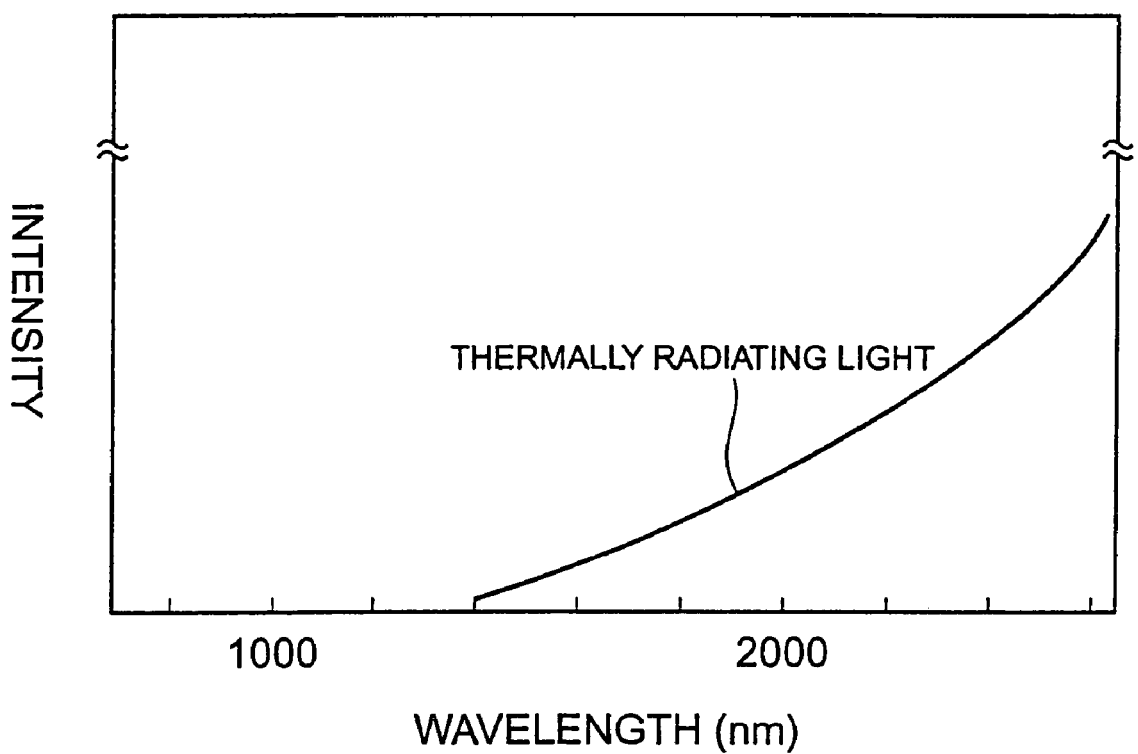
FIG. 11 is a chart showing the relationship between wavelength and intensity of light obtained after the light radiating from the welding areas shown in FIG. 1 is transmitted through the second cut filter.

The second cut filter 40 will now be explained with reference to FIGS. 9, 10, and 11 as well. FIG. 9 is a chart showing the relationship between wavelength and intensity of light radiating from the welding areas DA, UA. FIG. 10 is a chart showing the relationship between the wavelength and transmittance as a characteristic of the second cut filter. FIG. 11 is a chart showing the relationship between wavelength and intensity of light obtained after the light radiating from the welding areas DA, UA is transmitted through the second cut filter 40.

The second cut filter 40 is a filter which blocks the laser beams LB having the oscillation wavelength emitted from the semiconductor laser unit 20A in the light radiating from the welding areas DA, UA. FIG. 9, whose abscissa and ordinate indicate the wavelength and intensity of light, respectively, shows the light radiating from the welding areas DA, UA. As can be seen from FIG. 9, the welding areas DA, UA partly reflect the laser beams LB having the oscillation wavelength emitted from the semiconductor laser unit 20A, while generating thermally radiating beams RB. The laser beams LB having the oscillation wavelength from the welding areas DA, UA become noises when detecting the welding temperature of the welding areas. DA, UA. Therefore, as shown in FIG. 10, the second cut filter 40 has a property of transmitting therethrough light having a wavelength longer than 1100 nm in order to reliably transmit the thermally radiating beams RB therethrough and block the laser beams. LB having the oscillation wavelength of 810 nm. When the light radiating from the welding areas DA, UA enters the second cut filter 40 having such a property, only the thermally radiating beams RB pass therethrough as shown in FIG. 11. In each of FIGS. 9 and 11, the abscissa and ordinate indicate the wavelength and intensity of light, respectively.

The second cut filter 40 is disposed between the upper resin member UR and a light-collecting part 51 of the resin temperature measuring unit 50A, and is configured so as to be movable as the welding position moves. In this movable configuration, the second cut filter 40 may be moved together with the main unit 21 of the semiconductor laser unit 20A by the robot arm unit 60.

The resin temperature measuring unit 50A is a radiation thermometer which measures the welding temperature by using the thermally radiating beams RB from the welding areas DA, UA. Here, the resin temperature measuring unit 50A may be a monochromatic radiation thermometer which detects the temperature according to light having a single observation wavelength (e.g., 1800 nm) in the thermally radiating beams RB, or a polychromatic radiation thermometer which detects the temperature according to a plurality of observation wavelengths (e.g., two wavelengths of 1800 nm and 2000 nm) of light in the thermally radiating beams RB.

The resin temperature measuring unit 50A comprises the light-collecting part 51, an optical fiber 52, and a temperature detecting part 53. The light-collecting part 51 collects the thermally radiating beams RB transmitted through the second cut filter 40 from the welding areas DA, UA. Therefore, the light-collecting part 51 is disposed at a position where the thermally radiating beams RB are reliably received, and is configured so as to be movable as the welding position moves. In this movable configuration, the light-collecting part 51 may be moved together with the main unit 21 of the semiconductor laser unit 20A by the robot arm unit 60. The optical fiber 52 transmits the thermally radiating beams RB collected by the light-collecting part 51 to the temperature detecting part 53. The resin temperature measuring unit 50A also has a function of detecting the welding position.

The temperature detecting part 53 turns the thermally radiating beams RB transmitted and collected by the optical fiber 50 into collimated light, and extracts at least one observation wavelength light component from thus collimated light. Then, in the temperature detecting part 53, the individual observation wavelength light components are collected and made incident on an infrared detector, which photoelectrically converts each observation wavelength light component into an electric signal. Further, the temperature detecting part 53 calculates the welding temperature according to the electric signal of each observation wavelength.

The robot arm unit 60 is a unit which controls the focal position of the laser beams LB, the welding position, the welding speed, etc., and three-dimensionally moves the main unit 21 of the semiconductor laser unit 20A. The robot arm unit 60 may be configured such as to move the first cut filter 30, the second cut filter 40, and the light-collecting part 51 of the resin temperature measuring unit 50A three-dimensionally.

The robot arm unit 60 comprises a leading end part 61, an arm part 62, and a controller 63. The leading end part 61 has the main unit 21 and, when necessary, the first cut filter 30, second cut filter 40, and light-collecting part 51 attached thereto, and three-dimensionally moves the main unit 21, etc., according to operations of the arm part 62. The arm part 62 is a polyarticular arm which three-dimensionally moves the leading end part 61 according to a control signal from the controller 63. According to an instruction signal from the control unit 70, the controller 63 sends a control signal for moving the leading part 61 to the arm part 62.

The control unit 70 is a unit which integrally manages the resin welding apparatus 1A, and is connected to the controller 14 of the pressure applying unit 10, the controller 22 of the semiconductor laser unit 20A, the temperature detecting unit 53 of the resin temperature measuring unit 50A, and the controller 63 of the robot arm unit 60.

According to the welding temperature detected by the resin temperature measuring unit 50A, the control unit 70 regulates irradiation conditions of the semiconductor laser unit 20A (intensity, focus diameter, etc.), the focal position of the laser beams LB, the welding speed, etc. To this aim, the control unit 70 receives a signal indicative of the welding temperature detected from the temperature detecting part 53, and sends instruction signals to the controllers 22 and 63. According to the detected pressure between the upper resin member UR and lower resin member DR from a pressure sensor (not depicted), the control unit 70 controls the regulator 13 of the pressure applying unit 10 such that the pressure falls within a predetermined pressure range. Therefore, the control unit 70 receives a signal indicative of the detected pressure from the pressure sensor (not depicted) and sends an instruction signal to the controller 14.

The control unit 70 stores therein relationships between resin members UR, DR in a number of combinations and reference temperature ranges, and sets the reference temperature range according to two resin members UR, DR to be welded. The reference temperature range is set within a range of not higher than the welding temperature of the upper resin member UR and lower resin member DR, but not higher than their decomposition temperatures. The control unit 70 also stores therein relationships between resin members UR, DR in a number of combinations and reference pressure ranges, and sets the reference pressure range according to two resin members UR, DR to be welded. The control unit 70 further stores relationships between the resin members UR, DR and the welding temperature and pressure during welding. After welding, the control unit 70 reflects data concerning the welding temperature and pressure at the time of defective welding and the welding temperature and pressure at the time of favorable welding onto the reference temperature range, reference pressure range, irradiation conditions, etc., thereby further lowering the ratio of defective welding.

Operations of the resin welding apparatus 1A will now be explained with reference to FIGS. 1 to 11.

First, the lower resin member DR and upper resin member UR are stacked on each other and set to a predetermined position of the base plate 11. Then, in the resin welding apparatus 1A, the pressure applying unit 10 applies a pressure between the lower resin member DR and upper resin member UR according to an instruction from the control unit 70. Also, in the resin welding apparatus 1A, the robot arm unit 60 moves the main unit 21 of the semiconductor laser unit 20A and the like to their initial positions according to an instruction from the control unit 70. Then, in the resin welding apparatus 1A, the semiconductor laser unit 20A emits laser beams LB such that the welding temperature falls within a reference temperature range according to an instruction from the control unit 70.

Here, the semiconductor laser unit 20A emits not only the laser beams LB having the oscillation wavelength, but also the fluorescent beams FB generated by the first collimating lenses 21b, second collimating lens 21c, and condenser lens 21d (see FIG. 6). However, the fluorescent beams FB are blocked by the first cut filter 30. Therefore, only the laser beams LB having the oscillation wavelength transmitted through the first cut filter 30, pressure plate 12, and upper resin member UR reach the welding area DA of the lower resin member DR (see FIG. 8).

The laser beams LB having reached the welding area DA are absorbed thereby, whereby the welding area DA is heated and melted. This heat further heats and melts the welding area UA of the upper resin member UR, whereby the upper resin member UR and lower resin member DR are welded together. Here, the welding areas DA, UA generate thermally radiating beams RB and partly reflect the laser beams LB (see FIG. 9).

However, the laser beams LB reflected by the welding areas DA, UA are blocked by the second cut filter 40. Therefore, only the thermally radiating beams RB transmitted through the second cut filter 40 reach the light-collecting part 51 of the resin temperature measuring unit 50A (see FIG. 11). Namely, no light to become noise to the thermally radiating beams RB is incident on the light-collecting part 51 at all.

Therefore, the resin temperature measuring unit 50A detects a stable welding temperature with a high accuracy according to the thermally radiating beams RB alone. Then, according to the welding temperature with a high accuracy, the control unit 70 controls irradiation conditions (intensity, focus diameter, etc.) of the semiconductor laser unit 20A, the local position of the laser beams LB set by the robot arm unit 60, the welding speed, etc. Also, according to the pressure detected by the pressure sensor (not depicted), the control unit 70 controls the pressure between the resin members DR, UR caused by the pressure applying unit 10. The resin welding apparatus 1A emits the laser beams LB and applies a pressure between the resin members DR, UR according to thus controlled irradiation conditions, focal position, welding speed, pressure, etc., thereby performing stable welding at a pressure within the reference pressure range and a welding temperature within the reference temperature range, while changing the welding position.

In the resin welding apparatus 1A in accordance with the first embodiment, the first cut filter 30 reliably removes the fluorescent beams FB generated by optical means, which become noise light when detecting the welding temperature, before they are incident on the welding area DA, whereby the resin temperature measuring unit 50A can detect the welding temperature with a high accuracy. Therefore, the resin welding apparatus 1A can stably control the welding temperature, thereby lowering the ratio of defective welding. Also, the resin welding apparatus 1A can improve the accuracy in detecting the welding temperature by a simple configuration in which only the first cut filter 30 is added to a conventional configuration.

SECOND EMBODIMENT

Figure 12:
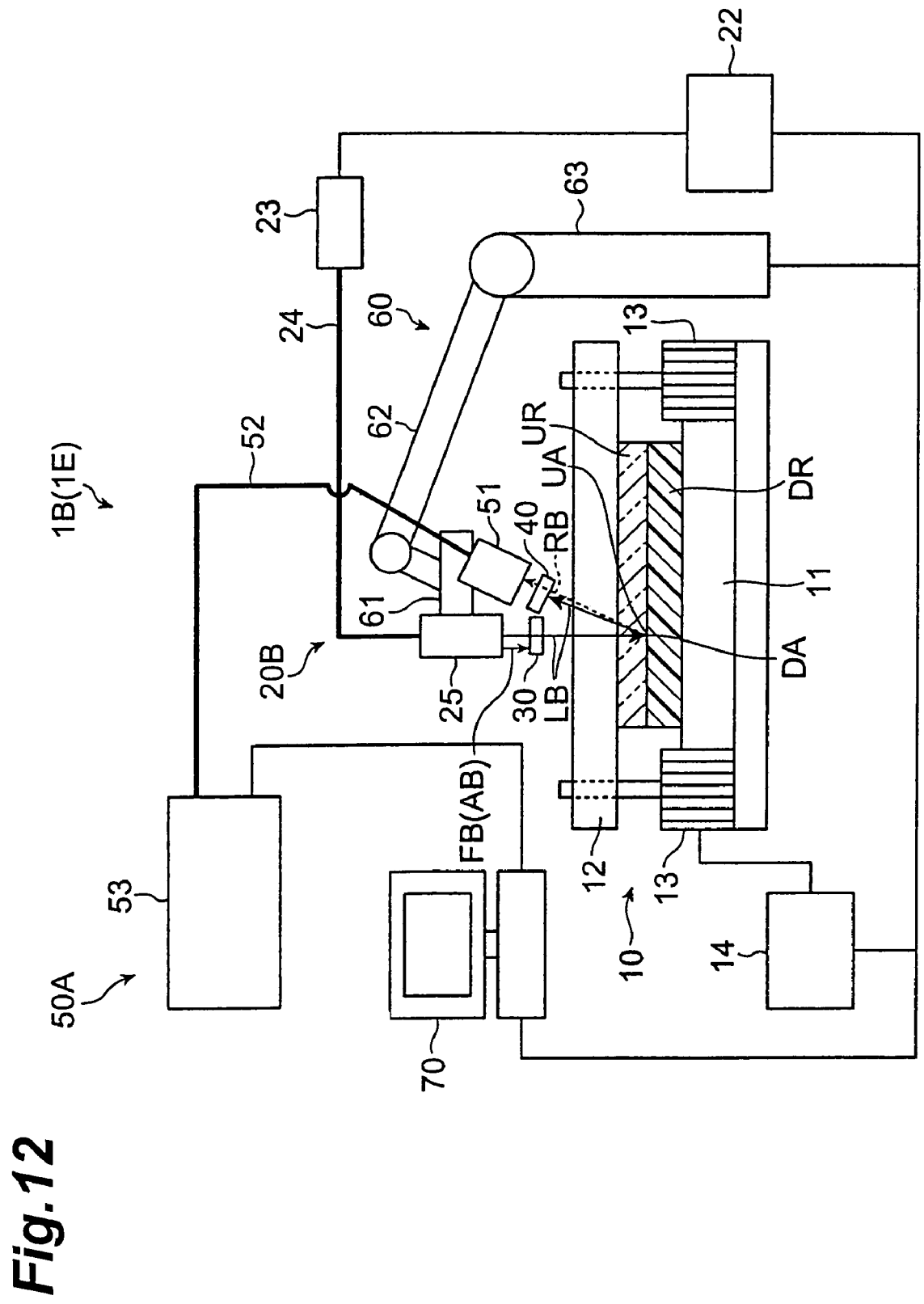
FIG. 12 is an overall diagram of the resin welding apparatus in accordance with second and fifth embodiments of the present invention.

A second embodiment will now be explained. With reference to FIG. 12, the configuration of a resin welding apparatus 1B will be explained. FIG. 12 is an overall diagram of the resin welding apparatus 1B in accordance with the second embodiment. In the second embodiment, constituents similar to those in the resin welding apparatus 1A in accordance with the first embodiment will be referred to with numerals identical thereto without repeating their overlapping explanations.

The resin welding apparatus 1B is an apparatus which controls the welding temperature so as to make it fall within a reference temperature range, and welds an upper resin member UR and a lower resin member DR, which are welding members, to each other in a stacked fashion while pressing them. To this aim, the resin welding apparatus 1B comprises a pressure applying unit 10, a semiconductor laser unit 20B, a first cut filter 30, a second cut filter 40, a resin temperature measuring unit 50A, a robot arm unit 60, and a control unit 70. The resin welding apparatus 1B differs from the resin welding apparatus 1A in accordance with the first embodiment only in that the configuration of the semiconductor laser unit 20B is of fiber-out type.

Figure 13:
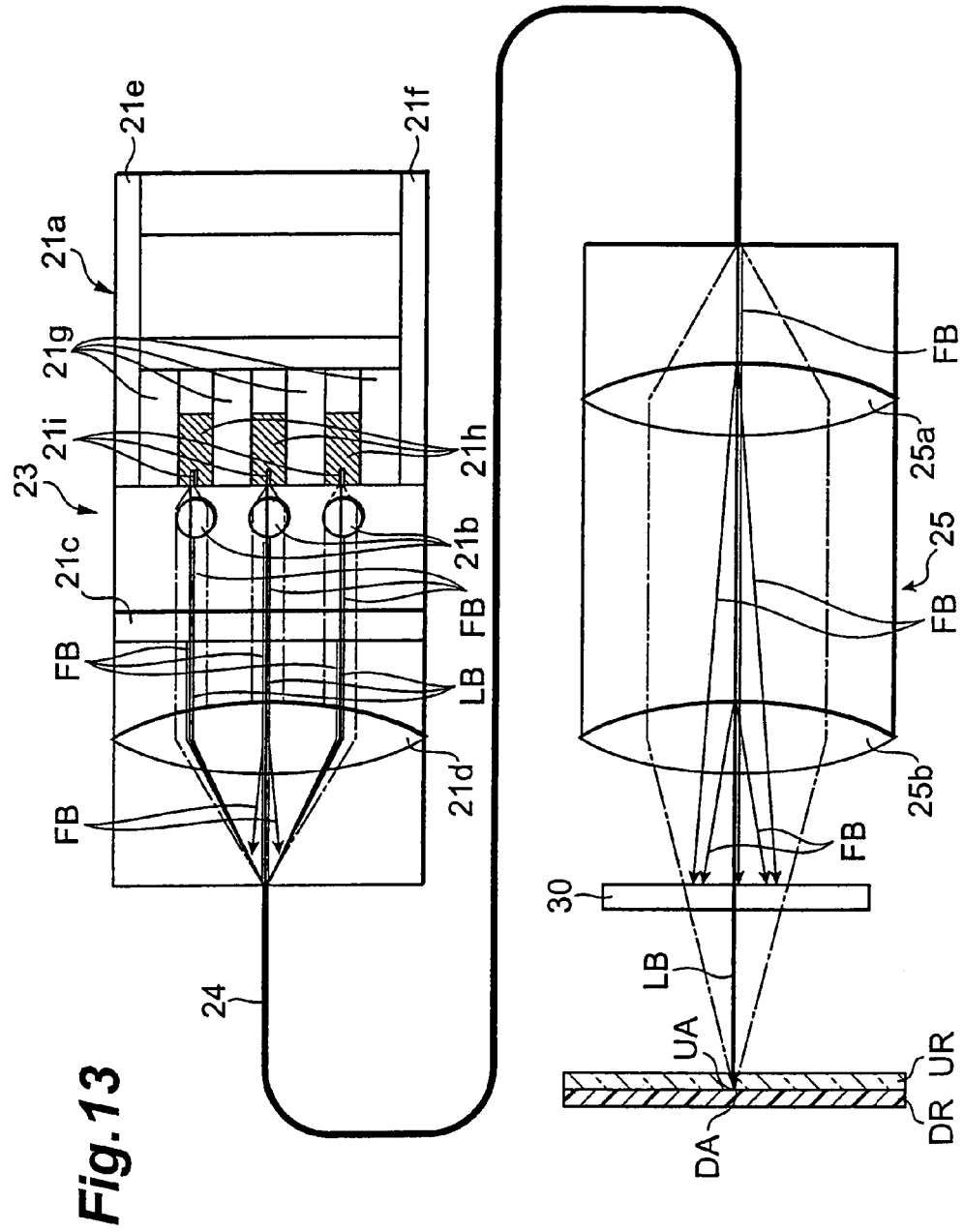
FIG. 13 is a side view of the semiconductor laser unit and first cut filter in the resin welding apparatus in accordance with the second embodiment.

The semiconductor laser unit 20B will be explained with reference to FIG. 13 as well. FIG. 13 is a side view of the semiconductor laser unit 20B and first cut filter 30.

The semiconductor laser unit 20B irradiates a welding area DA with laser beams LB (having an oscillation wavelength of 810 nm), so as to heat and melt the upper resin member UR and lower resin member DR. To this aim, the semiconductor laser unit 20B comprises a main unit 23, an optical fiber 24, an emitting part 25, and a controller 22. The main unit 23 generates laser beams LB according to a control signal from the controller 22, converges thus generated laser beams LB, and emits them to the optical fiber 24. The optical fiber 24 transmits the laser beams LB from the main unit 23 to the emitting part 25. The emitting part 25 collects the laser beams LB transmitted by the optical fiber 24, and emits them toward the welding area DA. According to instruction signals from the control unit 70, the controller 22 sends control signals for regulating irradiation conditions (intensity, focus diameter, etc.) to the main unit 23.

As with the main unit 21 in accordance with the first embodiment, the main unit 23 comprises a semiconductor laser 21a, first collimating lenses 21b, . . . , a second collimating lens 21c, and a condenser lens 21d. In the main unit 23, as in the main unit 21, the laser light emission points 21i emit respective laser beams LB, which are then converged by the first collimating lenses 21b, second collimating lens 21c, and condenser lens 21d. However, unlike the main unit 21, the main unit 23 makes thus converged laser beams LB incident on the optical fiber 24 instead of emitting them toward the welding area DA.

The emitting part 25 comprises a collimating lens 25a and a condenser lens 25b. The collimating lens 25a is arranged perpendicularly to the emitting direction of the laser beams LB transmitted through the optical fiber 24. The collimating lens 25a turns the laser beams LB transmitted through the optical fiber 24 into parallel light. The condenser lens 25b is arranged in front of the collimating lens 25a in the emitting direction of laser beams LB while in parallel with the collimating lens 25a. The condenser lens 25b has a predetermined focal length, and converges parallel light onto a focal point (welding area DA). In the second embodiment, the collimating lens 25a and condenser lens 25b in the emitting part 25 also generate fluorescent beams FB.

As in the foregoing, the semiconductor laser unit 20B is a high-output laser unit which emits a number of laser beams LB from the respective laser light emission points 21i and collects the laser beams LB. The semiconductor laser unit 20A is of fiber-out type in which the main unit 23 converges the laser beams LB, and thus converged laser beams LB are transmitted through the optical fiber 24 and emitted from the, emitting part 25 to the welding area DA. In the semiconductor laser unit 20B, the vertical position of the emitting part 25 is movable by the robot arm unit 60, so that the focal position of the laser beams LB is adjusted. Also, in the semiconductor laser unit 20B, the horizontal position of the emitting part 25 is movable by the robot arm unit 60, so that the welding speed and welding position are adjusted.

The first cut filter 30 is disposed at a position between the emitting part 25 of the semiconductor laser unit 20B and the upper resin member UR, where the laser beams LB and fluorescent beams FB acting as additional light pass, and is configured so as to be movable as the emitting part 25 of the semiconductor laser unit 20B moves. It will be sufficient for the first cut filter 30 to have a role of partly or wholly blocking the wavelength range of fluorescent beams FB emitted from the semiconductor laser unit. 20B before welding as mentioned above. Therefore, the first cut filter 30 may be disposed not only on the outside of the semiconductor laser unit 20B separately therefrom, but also within the semiconductor laser unit 20B as long as it is positioned closer to the welding areas DA, UA than is the optical means partly or wholly generating the wavelength range of fluorescent beams FB.

Operations of the resin welding apparatus 1B will now be explained with reference to FIGS. 12 and 13.

First, the lower resin member DR and upper resin member UR are stacked on each other and set to a predetermined position of the base plate 11. Then, in the resin welding apparatus 1B, the pressure applying unit 10 applies a pressure between the lower resin member DR and upper resin member UR according to an instruction from the control unit 70. Also, in the resin welding apparatus 1B, the robot arm unit 60 moves the emitting part 25 of the semiconductor laser unit 20B and the like to their initial positions according to an instruction from the control unit 70. Then, in the resin welding apparatus 1B, the semiconductor laser unit 20B emits laser beams LB such that the welding temperature falls within a reference temperature range according to an instruction from the control unit 70.

Here, in the semiconductor laser unit 20B, the laser beams LB generated and converged by the main unit 23 are made incident on the optical fiber 24. Then, in the semiconductor laser unit 20B, the laser beams LB are transmitted to the emitting part 25 through the optical fiber 24, and converged and emitted by the emitting part 25.

Operations after the laser beams LB are emitted from the semiconductor laser unit 20B in the resin welding apparatus 1B are the same as those in the resin welding apparatus 1A in accordance with the first embodiment and thus will not be explained. In the second embodiment, not only the first collimating lenses 21b, second collimating lens 21c, and condenser lens 21d, but also the collimating lens 25a and condenser lens 25b in the emitting part 25 generate the fluorescent beams FB, which are also emitted from the emitting part 25.

The resin welding apparatus 1B in accordance with the second embodiment not only yields the effects of the resin welding apparatus 1A in accordance with the first embodiment, but also can save the space for emitting the laser beams LB, since the emitting part 25 is constructed separately from the main unit 23 in the semiconductor laser unit 20B.

THIRD EMBODIMENT

Figure 14:
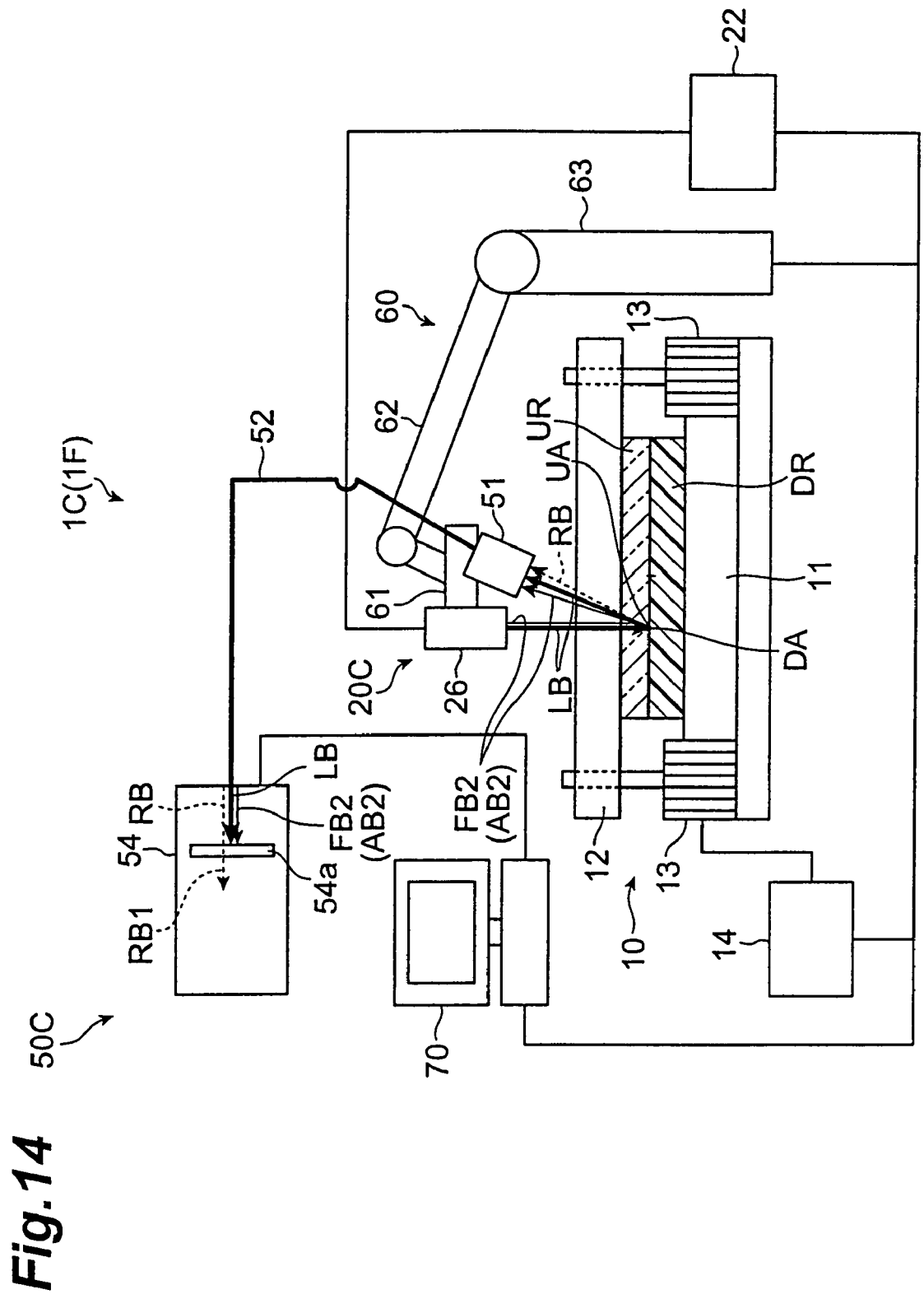
FIG. 14 is an overall diagram of the resin welding apparatus in accordance with third and sixth embodiments of the present invention.

A third embodiment will now be explained. With reference to FIG. 14, the configuration of a resin welding apparatus 1C will be explained. FIG. 14 is an overall diagram of the resin welding apparatus 1C in accordance with the third embodiment. In the third embodiment, constituents similar to those in the resin welding apparatus 1A in accordance with the first embodiment will be referred to with numerals identical thereto without repeating their overlapping explanations.

The resin welding apparatus 1C is an apparatus which controls the welding temperature so as to make it fall within a reference temperature range, and welds an upper resin member UR and a lower resin member DR, which are welding members, to each other in a stacked fashion while pressing them. To this aim, the resin welding apparatus 1C comprises a pressure applying unit 10, a semiconductor laser unit 20C, a resin temperature measuring unit 50C, a robot arm unit 60, and a control unit 70. The resin welding apparatus 1C differs from the resin welding apparatus 1A in accordance with the first embodiment in that a coating applied to optical means of the semiconductor laser unit 20C blocks a part of wavelength light components of the fluorescent beams FB instead of blocking the fluorescent beams FB by using the first cut filter 30.

Figure 15:
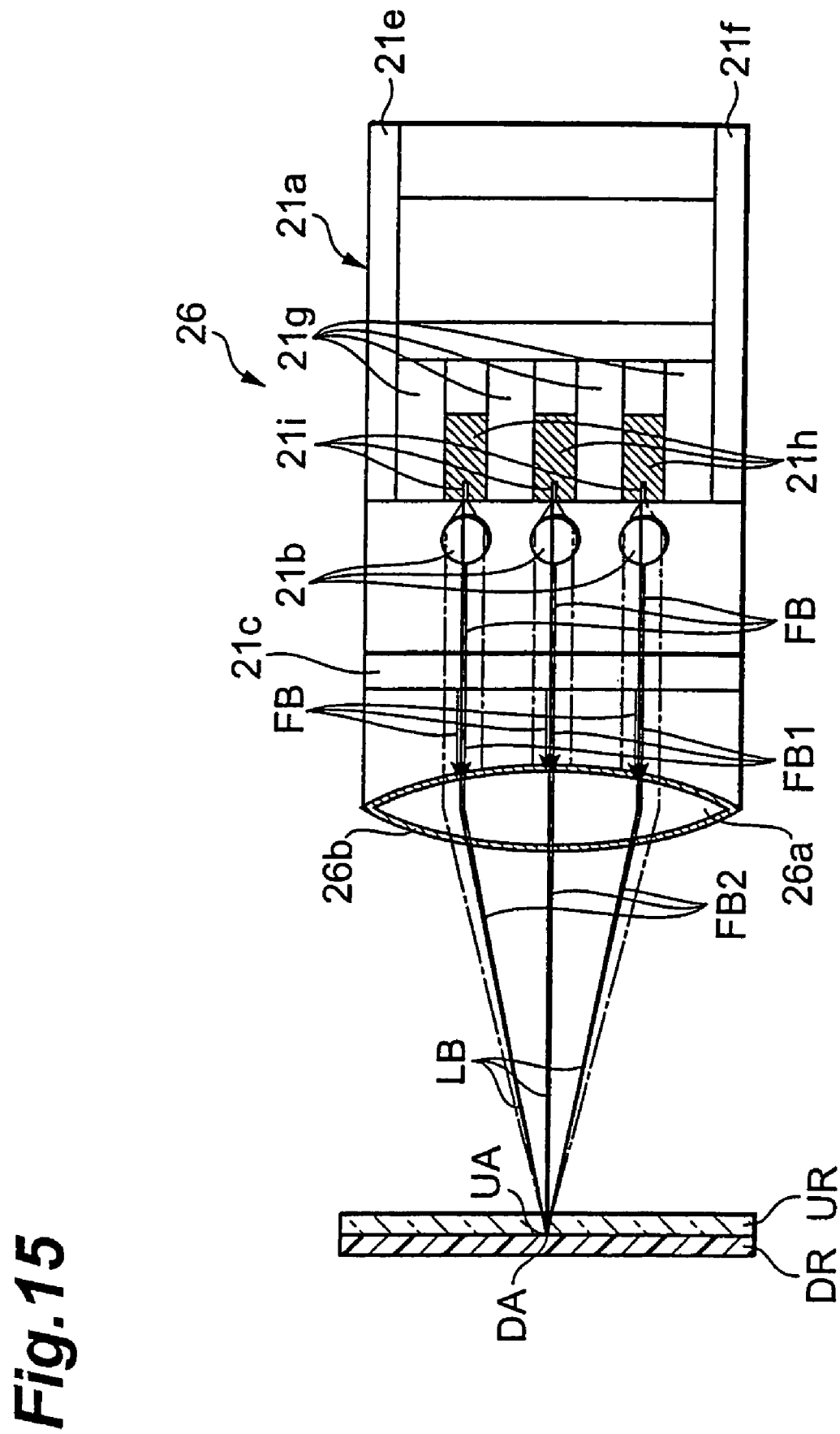
FIG. 15 is a side view of the semiconductor laser unit in the resin welding apparatus in accordance with the third embodiment.
Figure 16:
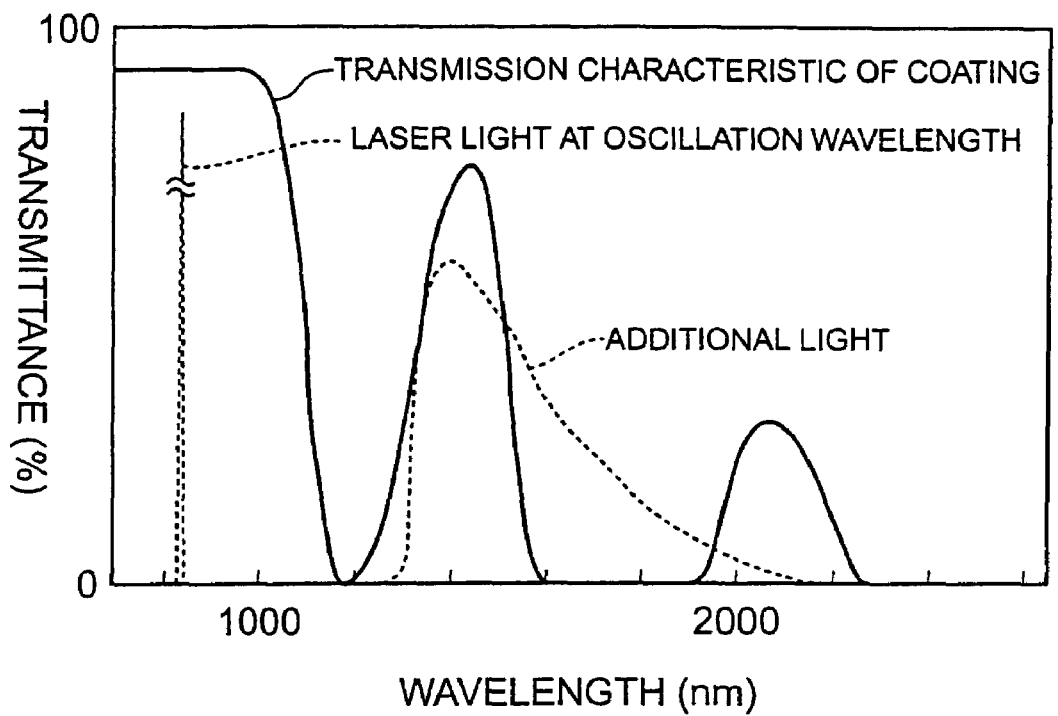
FIG. 16 is a chart showing the relationship between wavelength and transmittance as a characteristic of a coating of the condenser lens shown in FIG. 15.
Figure 17:
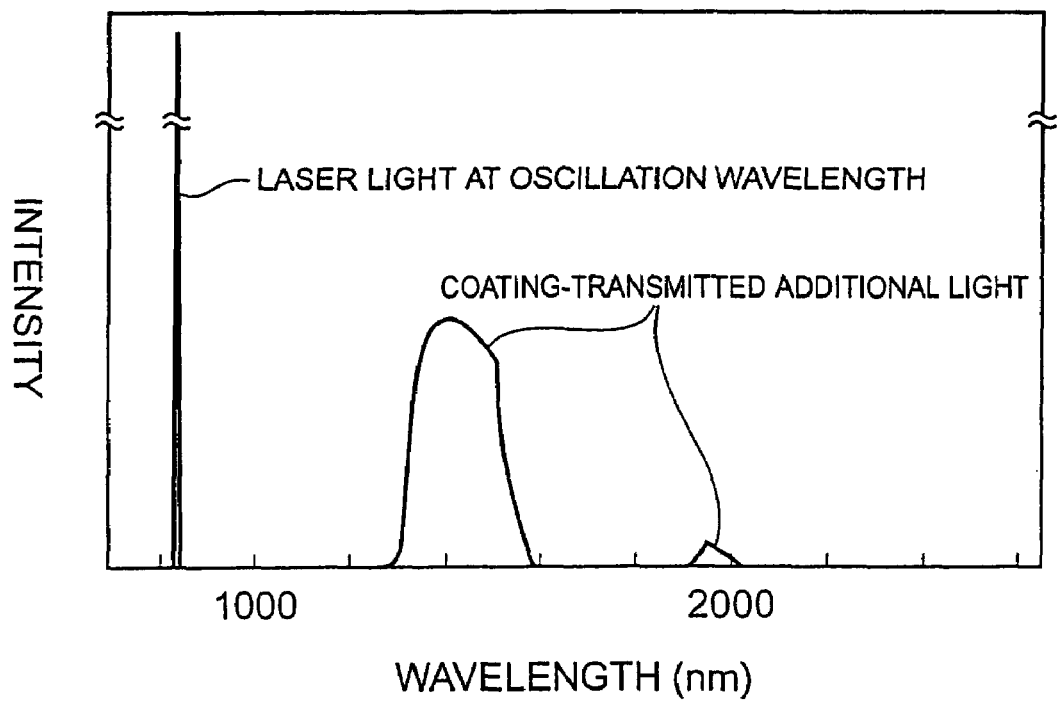
FIG. 17 is a chart showing the relationship between wavelength and intensity of light obtained after the light emitted from the semiconductor laser unit shown in FIG. 14 is transmitted through the condenser lens.

The semiconductor laser unit 20C will now be explained with reference to FIGS. 15, 16, and 17 as well. FIG. 15 is a side view of the semiconductor laser unit 20C. FIG. 16 is a chart showing the relationship between wavelength and transmittance as a characteristic of a coating 26b of a condenser lens 26a. FIG. 17 is a chart showing the relationship between wavelength and intensity of light obtained after the light emitted from the semiconductor laser unit 20C is transmitted through the condenser lens 26a.

The semiconductor laser unit 20C irradiates a welding area DA with laser beams LB (having an oscillation wavelength of 810 nm), so as to heat and melt the upper resin member UR and lower resin member DR. To this aim, the semiconductor laser unit 20C comprises a main unit 26 and a controller 22. The main unit 26 generates the laser beams LB according to a control signal from the controller 22, converges thus generated laser beams LB, and emits them toward the welding area DA. According to instruction signals from the control unit 70, the controller 22 sends control signals for regulating irradiation conditions (intensity, focus diameter, etc.) to the main unit 26.

The main unit 26 comprises a semiconductor laser 21a, first collimating lenses 21b, . . . , a second collimating lens 21c, and a condenser lens 26a. The main unit 26 differs from the main unit 21 in accordance with the first embodiment only in the condenser lens 26a, whereby only the condenser lens 26a will be explained. Here, the first collimating lenses 21b and second collimating lens 21c constitute first optical means for converging the laser beams LB generated by the semiconductor laser 21a onto the welding area DA, whereas the condenser lens 26a is second optical means for blocking a part of the wavelength range of fluorescent beams FB generated by the first optical means.

The condenser lens 26a is arranged in front of the second collimating lens 21c in the emitting direction of the laser beams LB. The condenser lens 26a has a predetermined focal length, and converges parallel light onto a focal point (welding area DA) For suppressing the reflection loss, the surface of the condenser lens 26a is provided with an antireflection coating 26b. This antireflection coating 26 is not a coating fully taking account of the wavelength region other than the oscillation wavelength of the laser beams LB, and thus has a property of blocking wavelength light beams FB1 in a part of fluorescent beams. FB generated by the first collimating lenses 21b and second collimating lens 21c. FIG. 16, whose abscissa and ordinate indicate the wavelength and transmittance of light, respectively, shows a transmission characteristic (solid line) of the coating 26b. As can be seen from FIG. 16, the coating 26b has a property of reliably transmitting the laser beams LB having the oscillation wavelength of 810 nm therethrough and blocking the light beams FB1 (hereinafter referred to as coating-blocked fluorescent beams) within a partial wavelength range (1600 nm to 1900 nm) of the fluorescent beams. FB acting as additional light. When the laser beams LB having the oscillation wavelength and fluorescent beams FB emitted from semiconductor laser 21a enter the condenser lens 26a provided with the coating 26b having such a property, light beams FB2 (hereinafter referred to as coating-transmitted fluorescent beams) excluding a partial wavelength range (1600 nm to 1900 nm) from the laser light beams LB having the oscillation wavelength and fluorescent beams FB are transmitted therethrough as shown in FIG. 17. In FIG. 17, the abscissa and ordinate indicate the wavelength and intensity of light, respectively.

Though the condenser lens 26a also generates fluorescent beams FB, it will be sufficient if the wavelength range of the fluorescent beams FB generated by the condenser lens 26a is not used by the resin temperature measuring unit 50C. Though the condenser lens 26a is provided with the coating 26b here, a coating having a property of blocking a partial wavelength range of the fluorescent beams FB generated by the first collimating lens 21b may be applied to the second collimating lens 21c as well.

The main unit 26 generates a voltage between the planar electrodes 21e, 21f according to a control signal from the controller 22, and emits the laser beams LB from the respective laser light emission points 21i according to this voltage. In the main unit 26, the laser beams LB emitted from the respective laser light emission points 21i are turned into parallel beams with respect to the latitudinal directions of the laser arrays 21h by the first collimating lenses 21b, and then are turned into parallel beams with respect to the longitudinal directions of the laser arrays 21h by the second collimating lens 21c. Finally, in the main unit 26, the laser beams LB turned into parallel beams are converged onto the welding area DA by the condenser lens 26b. Here, since the condenser lens 26a is provided with the coating 26b, the main unit 26 does not emit the light beams FB1 within the wavelength range of 1600 nm to 1900 nm. Therefore, no noise light will mingle into thermally radiating beams RB if the wavelength range of 1600 nm to 1900 nm is employed as an observation wavelength in the resin temperature measuring unit 50C.

Figure 18:
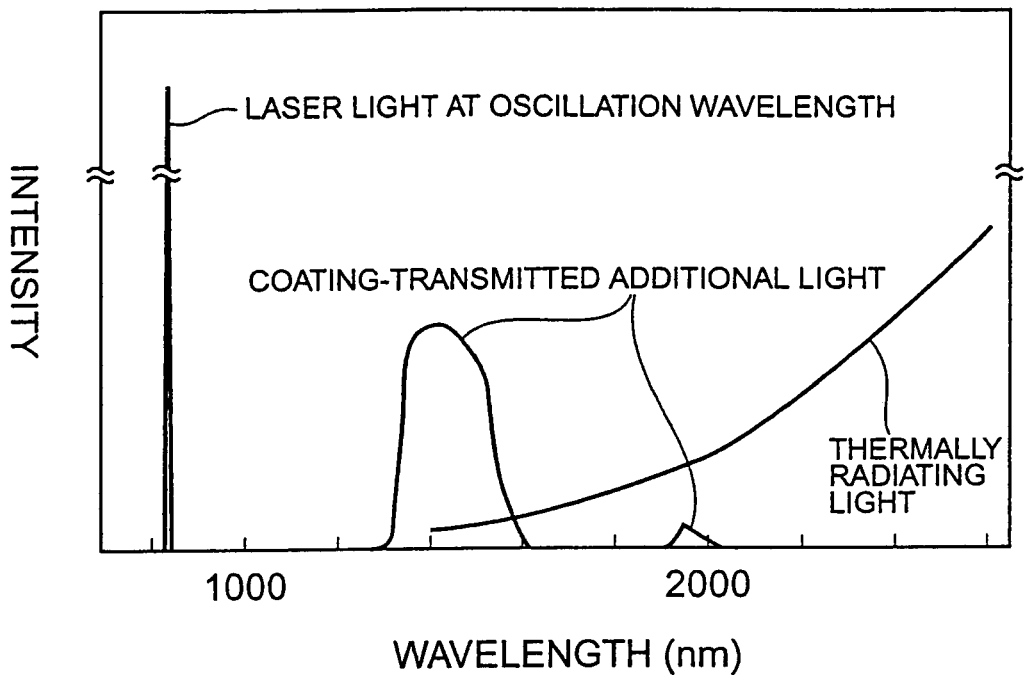
FIG. 18 is a chart showing relationships between wavelength and intensity of light radiating from the welding areas shown in FIG. 14.
Figure 19:
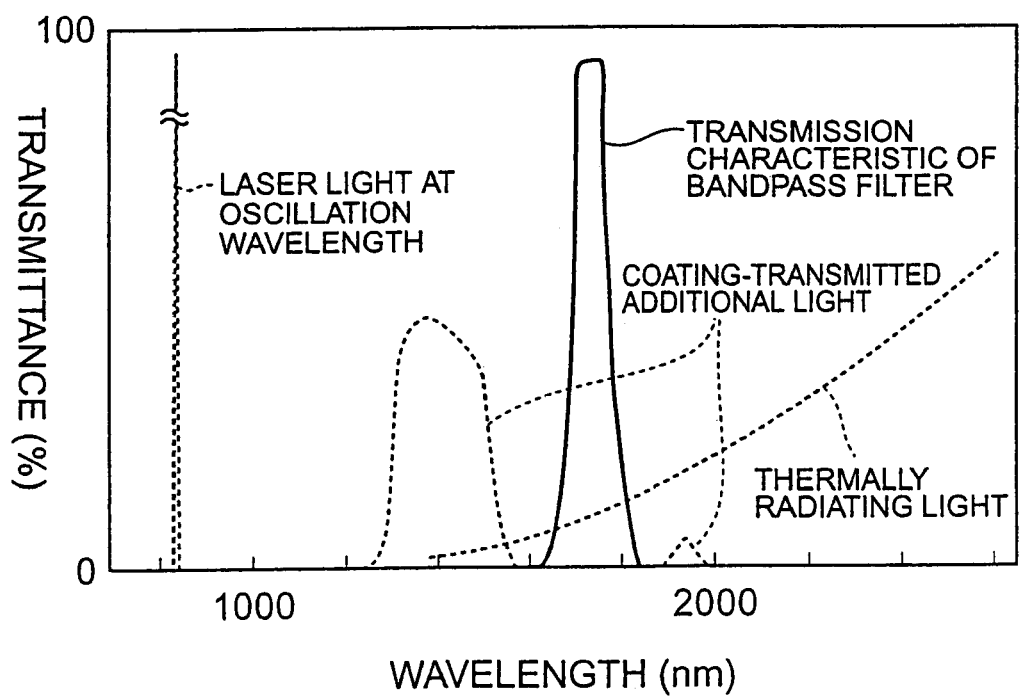
FIG. 19 is a chart showing the relationship between wavelength and transmittance as a characteristic of the bandpass filter shown in FIG. 14.
Figure 20:
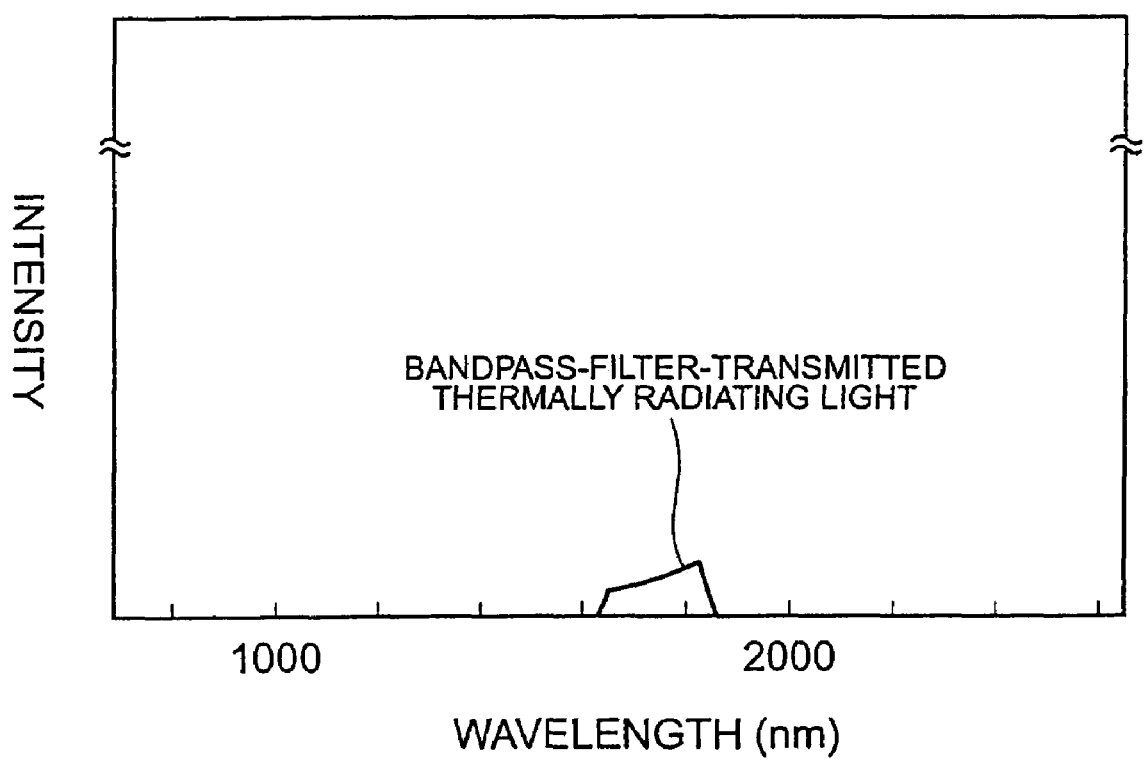
FIG. 20 is a chart showing the relationship between wavelength and intensity of light obtained after light radiating from the welding areas shown in FIG. 14 is transmitted through the bandpass filter.

The resin temperature measuring unit 50C will now be explained with reference to FIGS. 18, 19, and 20 as well. FIG. 18 is a chart showing relationships between wavelength and intensity of light radiating from the welding areas DA, UA. FIG. 19 is a chart showing the relationship between wavelength and transmittance as a characteristic of a bandpass filter 54a. FIG. 20 is a chart showing the relationship between wavelength and intensity of light obtained after light radiating from the welding areas DA, UA is transmitted through the bandpass filter 54a.

The resin temperature measuring unit 50C is a radiation thermometer which measures the welding temperature by using thermally radiating beams RB from the welding areas DA, UA. Here, the resin temperature measuring unit 50C may be a monochromatic radiation thermometer which detects the temperature according to light having a single observation wavelength in the thermally radiating beams RB, or a polychromatic radiation thermometer which detects the temperature according to a plurality of observation wavelengths of light in the thermally radiating beams RB. The observation wavelength range is restricted in the resin temperature measuring unit 50C in particular to the range of 1600 nm to 1900 nm blocked by the coating applied to the condenser lens 26a of the semiconductor laser unit 20C.

The resin temperature measuring unit 50C comprises a light-collecting part 51, an optical fiber 52, and a temperature detecting part 54. The resin temperature measuring unit 50C differs from the resin temperature measuring unit 50A in accordance with the first embodiment only in the temperature detecting part 54, whereby only the temperature detecting part 54 will be explained. FIG. 18, whose abscissa and ordinate indicate the wavelength and intensity of light, respectively, shows light radiating from the welding areas DA, UA. As can be seen from FIG. 18, the welding areas DA, UA reflect a part of the laser beams LB having the oscillation wavelength emitted from the semiconductor laser unit 20C and a part of the coating-transmitted fluorescent beams FB2, while generating thermally radiating beams RB. The laser beams LB having the oscillation wavelength and coating-transmitted fluorescent beams FB2 from the welding areas DA, UA become noises when detecting the welding temperature of the welding areas DA, UA. Therefore, in the resin temperature measuring unit 50C, the laser beams LB having the oscillation wavelength and coating-transmitted fluorescent beams FB2 are removed by the temperature detecting part 54.

To this aim, the temperature detecting part 54 is equipped with the bandpass filter 54a. The bandpass filter 54a is a filter which is disposed at a position where the light transmitted through the optical fiber 52 is received, and transmits therethrough only the thermally radiating beams RB1 corresponding to the wavelength range (1600 nm to 1900 nm) blocked by the coating 26b of the semiconductor laser unit 20C in the light transmitted through the optical fiber 52 after having radiated from the welding areas DA, UA. As shown in FIG. 19, the bandpass filter 54a has a property of reliably transmitting therethrough the thermally radiating beams RB1 (hereinafter referred to as bandpass-filter-transmitted thermally radiating beams) within the wavelength range slightly longer on the shorter wavelength side and shorter on the longer wavelength side than the wavelength range (1600 nm to 1900 nm) blocked by the coating 26b. When the light radiating from the welding areas DA, UA enters the bandpass filter 54a having such a property, only the thermally radiating beams RB1 within the wavelength range slightly longer on the shorter wavelength side and shorter on the longer wavelength side than the wavelength range of 1600 nm to 1900 nm are transmitted therethrough. In each of FIGS. 19 and 20, the abscissa and ordinate indicate the wavelength and intensity of light, respectively.

The temperature detecting part 54 turns the bandpass-filter-transmitted thermally radiating beams RB1 transmitted through the bandpass filter 54a into collimated light, and then extracts at least one observation wavelength light component from thus collimated light. The observation wavelength is set to a wavelength within the wavelength range transmitted through the bandpass filter 54a. Then, in the temperature detecting part 54, the individual observation wavelength light components are collected and made incident on an infrared detector, which photoelectrically converts each observation wavelength light component into an electric signal. Further, the temperature detecting part 54 calculates the welding temperature according to the electric signal of each observation wavelength.

Operations of the resin welding apparatus 1C will now be explained with reference to FIGS. 14 to 20.

First, the lower resin member DR and upper resin member UR are stacked on each other and set to a predetermined position of the base plate 11. Then, in the resin welding apparatus 1C, the pressure applying unit 10 applies a pressure between the lower resin member DR and upper resin member UR according to an instruction from the control unit 70. Also, in the resin welding apparatus 1C, the robot arm unit 60 moves the main unit 26 of the semiconductor laser unit 20C and the like to their initial positions according to an instruction from the control unit 70. Then, in the resin welding apparatus 1C, the semiconductor laser unit 20C emits laser beams LB such that the welding temperature falls within a reference temperature range according to an instruction from the control unit 70.

Here, the semiconductor laser unit 20C generates not only the laser beams LB having the oscillation wavelength, but also the fluorescent beams FB caused by the first collimating lenses 21b, second collimating lens 21c, and condenser lens 26a. However, in the semiconductor laser unit 20C, the coating 26b of the condenser lens 26a blocks the light beams FB1 within a partial wavelength range of the fluorescent beams FB. Therefore, the laser beams LB having the oscillation wavelength transmitted through the coating 26b, pressure plate 12, and upper resin member UR and the fluorescent beams FB2 transmitted through the coating reach the welding area DA of the lower resin member DR (see FIG. 17).

The laser beams LB having reached the welding area DA are absorbed thereby, whereby the welding area DA is heated and melted. This heat further heats and melts the welding area UA of the upper resin member UR, whereby the upper resin member UR and lower resin member DR are welded together. Here, the welding areas DA, UA generate thermally radiating beams RB and partly reflect the laser beams LB and coating-transmitted fluorescent beams FB2 (see FIG. 18).

Then, in the resin temperature measuring unit 50C, the thermally radiating beams RB, laser beams LB, and coating-transmitted fluorescent beams FB2 reach the light-collecting part 51, and are transmitted through the optical fiber 52 to the temperature detecting part 54. In the temperature detecting part 54, the bandpass filter 54a blocks the laser beams LB, coating-transmitted fluorescent beams FB2, and a part of the thermally radiating beams RB, so that only the bandpass-filter-transmitted thermally radiating beams RB1 are transmitted therethrough. Namely, the bandpass filter 54a removes light to become noises.

Therefore, the temperature detecting part 54 detects a stable welding temperature with a high accuracy according to the bandpass-filter-transmitted thermally radiating beams RB1 alone. Then, according to the welding temperature with a high accuracy, the control unit 70 controls irradiation conditions (intensity, focus diameter, etc.) of the semiconductor laser unit 20C, the focal position of the laser beams LB set by the robot arm unit 60, the welding speed, etc. Also, according to the pressure detected by a pressure sensor (not depicted), the control unit 70 controls the pressure between the resin members DR, UR caused by the pressure applying unit 10. The resin welding apparatus 1C emits the laser beams LB and applies a pressure between the resin members DR, UR according to thus controlled irradiation conditions, focal position, welding speed, pressure, etc., thereby performing stable welding at a pressure within the reference pressure range and a welding temperature within the reference temperature range, while changing the welding position.

In the resin welding apparatus 1C in accordance with the third embodiment, light beams within a partial wavelength range of the fluorescent beams FB generated by the first optical means, which become noise light when detecting the welding temperature, are removed by the coating 26b applied to the condenser lens 26a before being made incident on the welding area DA, whereby the resin temperature measuring unit 50C can detect the welding temperature with a high accuracy. Therefore, the resin welding apparatus 1C stabilizes the control of the welding temperature, and lowers the ratio of defective welding. Also, since the coating 26b usually applied to the optical means of the semiconductor laser unit 20C partly blocks the fluorescent beams FB, the resin welding apparatus 1C does not separately need a cut filter or the like. Therefore, the resin welding apparatus 1C can improve the accuracy in detecting the welding temperature at low cost.

FOURTH EMBODIMENT

Figure 21:
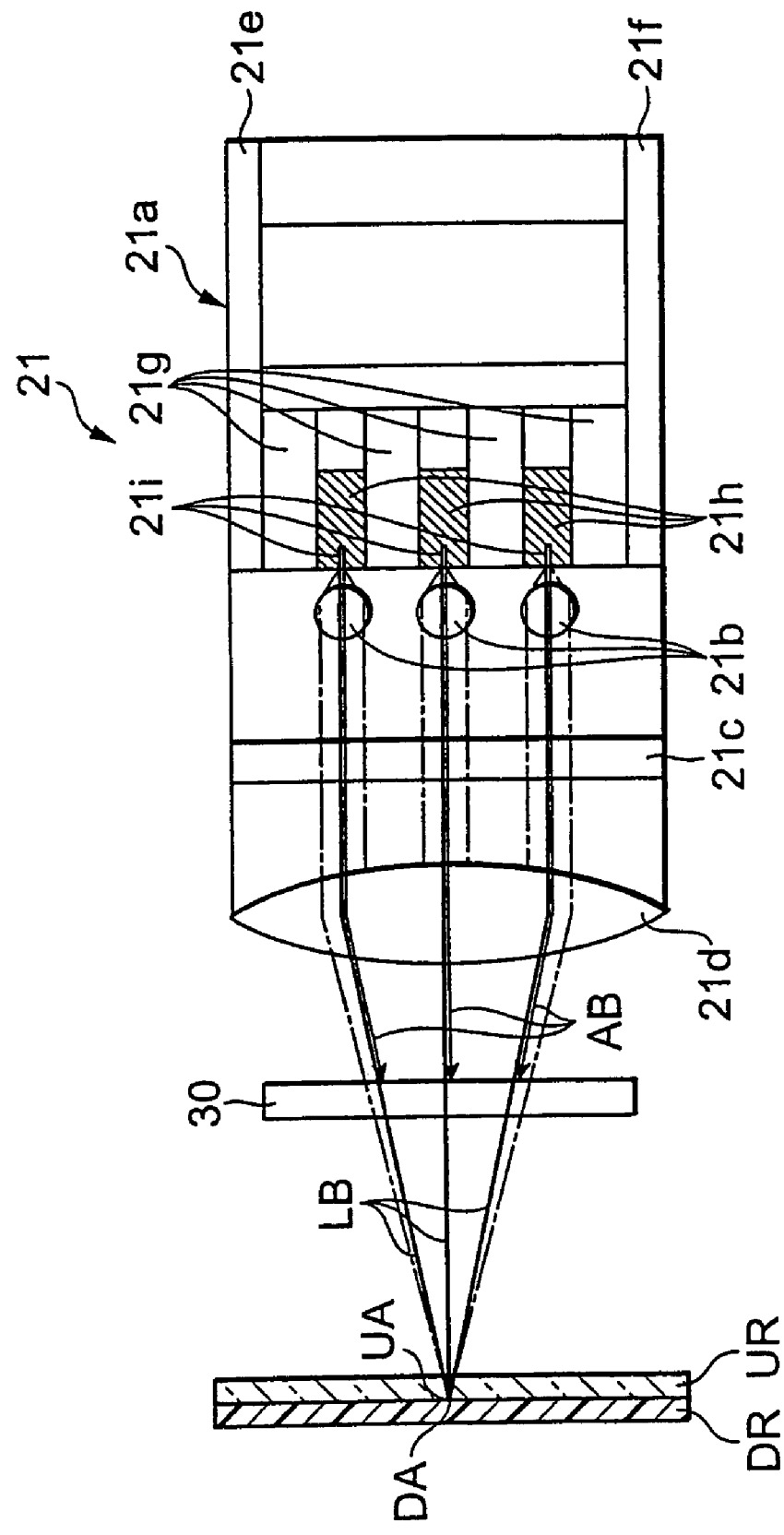
FIG. 21 is a side view of the semiconductor laser unit and first cut filter in the resin welding apparatus in accordance with the fourth embodiment.

A fourth embodiment will now be explained. The resin welding apparatus 1D in accordance with the fourth embodiment has the same configuration as with the resin welding apparatus 1A in accordance with the first embodiment as shown in FIG. 1, and thus will not be explained in detail. However, the resin welding apparatus 1D in accordance with the fourth embodiment differs from the resin welding apparatus 1A in accordance with the first embodiment in that light beams AB generated by the semiconductor laser 21a itself other than the oscillation wavelength are blocked by a first cut filter 30 (i.e., the first embodiment substantially corresponds to the fourth embodiment if the "fluorescent beams FB" in the explanation of the first embodiment are assumed to be "light beams AB other than the oscillation wavelength") as shown in FIG. 21.

This is because one of reasons why a semiconductor laser unit emits additional light (light components other than the oscillation wavelength of the semiconductor laser in the light generated by the semiconductor laser unit) is the generation of light other than the oscillation wavelength from the semiconductor laser itself. In particular, a high-output type semiconductor laser generates laser light beams from a number of laser light emission points, and thus seems to yield light beams having various wavelengths. As a cause of the generation of such laser beams in this semiconductor laser, there is a possibility of light being emitted from an impurity level or defect level within the semiconductor. Namely, the semiconductor laser for welding has such a high output that its resonator has a size of 1 µm×100 µm, for example. If this resonator outputs a laser beam of 1 W, the laser power density will be at least 1 MW/cm$^2$. At such a laser power density, a light component other than the oscillation wavelength seems to be generated from an impurity level, a defect level, or the like within the semiconductor constituting the resonator.

For example, the semiconductor laser unit 20A in accordance with the fourth embodiment emits the laser beams LB having the oscillation wavelength (810 nm) and light beams AB other than the oscillation wavelength which are additional light as shown in FIG. 6. FIG. 6, whose abscissa and ordinate indicate the wavelength and intensity of light, respectively, is a chart showing relationships between wavelength and intensity in laser light having the oscillation wavelength and additional light (light other than the oscillation wavelength from the semiconductor laser itself here) emitted from the semiconductor laser unit. Therefore, "additional light" in FIGS. 5 and 7 is "light other than the oscillation wavelength" in the fourth embodiment.

It will be sufficient for the first cut filter 30 to have a role of blocking the light beams AB other than the oscillation wavelength emitted from the semiconductor laser unit 20A before welding. Therefore, the first cut filter 30 may be disposed not only on the outside of the semiconductor laser unit 20A separately therefrom, but also within the semiconductor laser unit 20A. For example, the first cut filter 30 may be disposed between the first collimating lenses 21b and second collimating lens 21c, between the second collimating lens 21c and the condenser lens 21d, etc. Preferably, the first cut filter 30 is disposed at a position where the luminous flux of laser beams LB is widened (energy density is lower). This is because the semiconductor laser unit 20A has such a high output that the energy density is higher at a position where the laser beams LB are converged, whereby the first cut filter 30 is damaged by heat.

Operations of the resin welding apparatus 1D will now be explained with reference to FIGS. 1, 3 to 11, and 21.

First, the lower resin member DR and upper resin member UR are stacked on each other and set to a predetermined position of the base plate 11. Then, in the resin welding apparatus 1D, the pressure applying unit 10 applies a pressure between the lower resin member DR and upper resin member UR according to an instruction from the control unit 70. Also, in the resin welding apparatus 1D, the robot arm unit 60 moves the main unit 21 of the semiconductor laser unit 20A and the like to their initial positions according to an instruction from the control unit 70. Then, in the resin welding apparatus 1D, the semiconductor laser unit 20A emits laser beams LB such that the welding temperature falls within a reference temperature range according to an instruction from the control unit 70.

Here, the semiconductor laser unit 20A emits not only the laser beams LB having the oscillation wavelength, but also the light beams AB other than the oscillation wavelength (see FIG. 6). However, the light beams AB other than the oscillation wavelength are blocked by the first cut filter 30. Therefore, only the laser beams LB having the oscillation wavelength transmitted through the first cut filter 30, pressure plate 12, and upper resin member UR reach the welding area DA of the lower resin member DR (see FIG. 8).

The laser beams LB having reached the welding area DA are absorbed thereby, whereby the welding area DA is heated and melted. This heat further heats and melts the welding area UA of the upper resin member UR, whereby the upper resin member UR and lower resin member DR are welded together. Here, the welding areas DA, UA generate thermally radiating beams RB and partly reflect the laser beams LB (see FIG. 9).

However, the laser beams LB reflected by the welding areas DA, UA are blocked by the second cut filter 40. Therefore, only the thermally radiating beams RB transmitted through the second cut filter 40 reach the light-collecting part 51 of the resin temperature measuring unit 50A (see FIG. 11). Namely, no light to become noise to the thermally radiating beams RB is incident on the light-collecting part 51 at all.

Therefore, the resin temperature measuring unit 50A detects a stable welding temperature with a high accuracy according to the thermally radiating beams RB alone. Then, according to the welding temperature with a high accuracy, the control unit 70 controls irradiation conditions (intensity, focus diameter, etc.) of the semiconductor laser unit 20A, the focal position of the laser beams LB by the robot arm unit 60, the welding speed, etc. Also, according to the pressure detected by a pressure sensor (not depicted), the control unit 70 controls the pressure between the resin members DR, UR caused by the pressure applying unit 10. The resin welding apparatus 1D emits the laser beams LB and applies a pressure between the resin members DR, UR according to thus controlled irradiation conditions, focal position, welding speed, pressure, etc., thereby performing stable welding at a pressure within the reference pressure range and a welding temperature within the reference temperature range, while changing the welding position.

In the resin welding apparatus 1D in accordance with the fourth embodiment, the first cut filter 30 reliably removes the light beams AB other than the oscillation wavelength, which become noise light when detecting the welding temperature, before they are incident on the welding area DA, whereby the resin temperature measuring unit 50A can detect the welding temperature with a high accuracy. Therefore, the resin welding apparatus 1D can stably control the welding temperature, thereby lowering the ratio of defective welding. Also, the resin welding apparatus 1D can improve the accuracy in detecting the welding temperature by a simple configuration in which only the first cut filter 30 is added to a conventional configuration.

FIFTH EMBODIMENT

Figure 22:
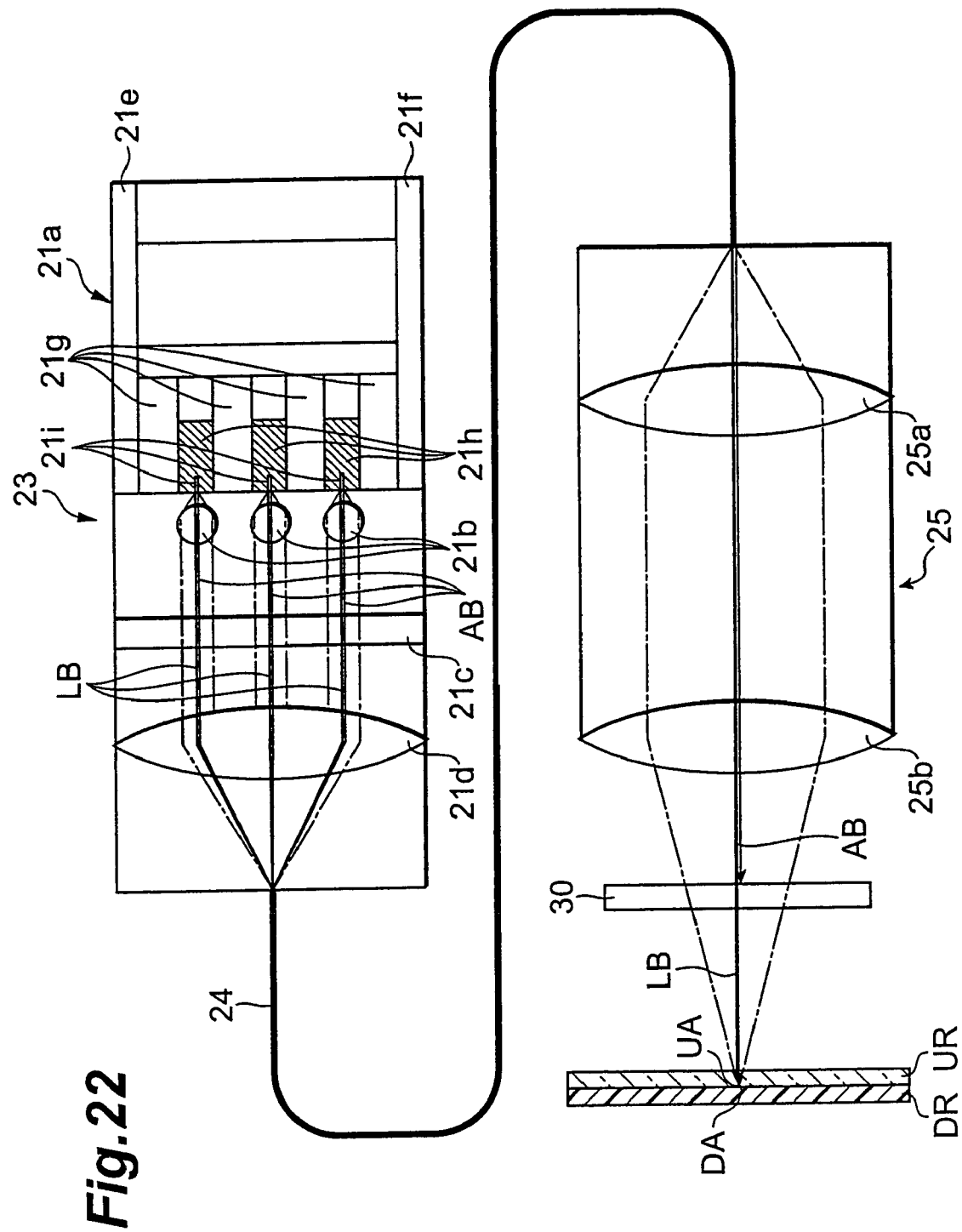
FIG. 22 is a side view of the semiconductor laser unit and first cut filter in the resin welding apparatus in accordance with the fifth embodiment.

A fifth embodiment will now be explained. The resin welding apparatus 1E in accordance with the fifth embodiment has the same configuration as with the resin welding apparatus 1B in accordance with the second embodiment as shown in FIG. 12, and thus will not be explained in detail. However, the resin welding apparatus 1E in accordance with the fifth embodiment differs from the resin welding apparatus 1B in accordance with the second embodiment in that light beams AB generated by the semiconductor laser 21a itself other than the oscillation wavelength are blocked by a first cut filter 30 (i.e., the second embodiment substantially corresponds to the fifth embodiment if the "fluorescent beams FB" in the explanation of the second embodiment are assumed to be "light beams AB other than the oscillation wavelength") as shown in FIG. 22.

The first cut filter 30 in accordance with the fifth embodiment is disposed at a position between the emitting part 25 of the semiconductor laser unit 20B and the upper resin member UR, where the laser beams LB and light beams AB acting as additional light pass, and is configured so as to be movable as the emitting part 25 of the semiconductor laser unit 20B moves. It will be sufficient for the first cut filter 30 to have a role of blocking the light beams AB emitted from the semiconductor laser unit 20B other than the oscillation wavelength before welding as mentioned above. Therefore, the first cut filter 30 may be disposed not only on the outside of the semiconductor laser unit 20B separately therefrom, but also within the semiconductor laser unit 20B. For example, the first cut filter 30 may be disposed between the first collimating lenses 21b and second collimating lens 21c, between the second collimating lens 21c and condenser lens 21d, between the condenser lens 21d and optical fiber 24, between the collimating lens 25a and condenser lens 25b, etc.

Operations of the resin welding apparatus 1E will now be explained with reference to FIGS. 12 and 22.

First, the lower resin member DR and upper resin member UR are stacked on each other and set to a predetermined position of the base plate 11. Then, in the resin welding apparatus 1E, the pressure applying unit 10 applies a pressure between the lower resin member DR and upper resin member UR according to an instruction from the control unit 70. Also, in the resin welding apparatus 1E, the robot arm unit 60 moves the emitting part 25 of the semiconductor laser unit 20B and the like to their initial positions according to an instruction from the control unit 70. Then, in the resin welding apparatus 1E, the semiconductor laser unit 20B emits laser beams LB such that the welding temperature falls within a reference temperature range according to an instruction from the control unit 70.

Here, in the semiconductor laser unit 20B, the laser beams LB generated and converged by the main unit 23 are made incident on the optical fiber 24. Then, in the semiconductor laser unit 20B, the laser beams LB are transmitted to the emitting part 25 through the optical fiber 24, and converged and emitted by the emitting part 25.

Operations after the laser beams LB are emitted from the semiconductor laser unit 20B in the resin welding apparatus 1E are the same as those in the resin welding apparatus 1D in accordance with the fourth embodiment and thus will not be explained.

The resin welding apparatus 1E in accordance with the fifth embodiment not only yields the effects of the resin welding apparatus 1D in accordance with the fourth embodiment, but also can save the space for emitting the laser beams LB, since the emitting part 25 is constructed separately from the main unit 23 in the semiconductor laser unit 20B.

SIXTH EMBODIMENT

Figure 23:
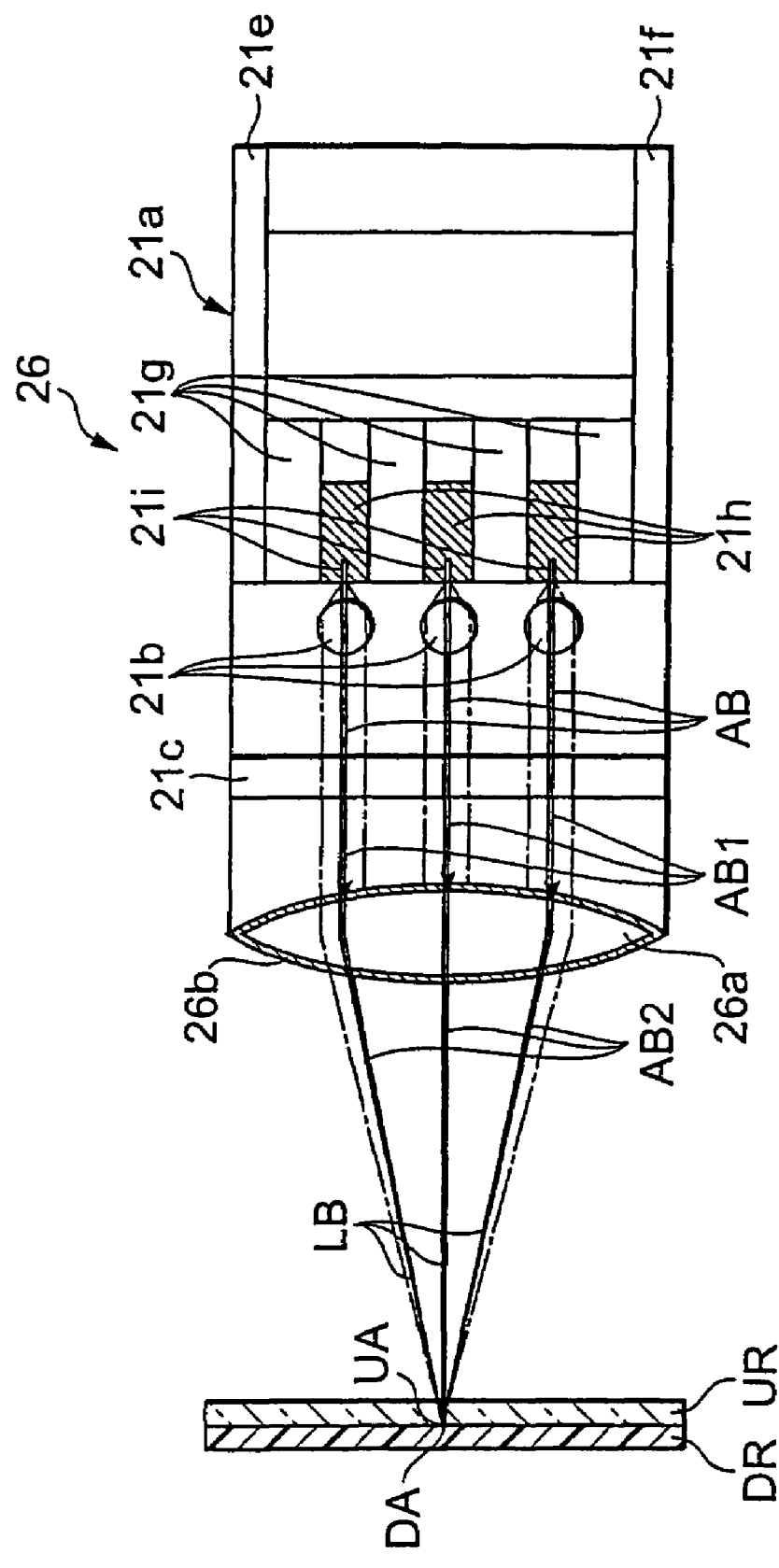
FIG. 23 is a side view of the semiconductor laser unit in the resin welding apparatus in accordance with the sixth embodiment.

A sixth embodiment will now be explained. The resin welding apparatus 1F in accordance with the sixth embodiment has the same configuration as with the resin welding apparatus 1C in accordance with the third embodiment as shown in FIG. 14, and thus will not be explained in detail. However, the resin welding apparatus 1F in accordance with the sixth embodiment differs from the resin welding apparatus 1C in accordance with the third embodiment in that light beams AB generated by the semiconductor laser 21a itself other than the oscillation wavelength are blocked by a coating applied to the optical means in the semiconductor laser unit 20 (i.e., the third embodiment substantially corresponds to the sixth embodiment if the "fluorescent beams FB" in the explanation of the third embodiment are assumed to be "light beams AB other than the oscillation wavelength") as shown in FIG. 23.

The condenser lens 26a in accordance with the sixth embodiment is arranged in front of the second collimating lens 21c in the emitting direction of the laser beams LB. The condenser lens 26a has a predetermined focal length, and converges parallel light onto a focal point (welding area DA). For suppressing the reflection loss, the surface of the condenser lens 26a is provided with an antireflection coating 26b. This antireflection coating 26 is not a coating fully taking account of the wavelength region other than the oscillation wavelength of the laser beams LB, and thus has a property of blocking light beams AB1 in a part of the light beams AB other than the oscillation wavelength. As can be seen from FIG. 16, the coating 26b has a property of reliably transmitting the laser beams LB having the oscillation wavelength of 810 nm therethrough and blocking the light beams AB1 (hereinafter referred to as coating-blocked light beams other than the oscillation wavelength) within a partial wavelength range (1600 nm to 1900 nm) of the light beams AB other than the oscillation wavelength acting as additional light. When the laser beams LB and light beams AB other than the oscillation wavelength emitted from semiconductor laser 21a enter the condenser lens 26a provided with the coating 26b having such a property, light beams AB2 (hereinafter referred to as coating-transmitted light beams other than the oscillation wavelength) excluding a partial wavelength range (1600 nm to 1900 nm) from the light beams AB other than the oscillation wavelength are transmitted therethrough as shown in FIG. 17.

Though the condenser lens 26 is provided with the coating 26b, the first collimating lenses 21b and second collimating lens 21c, which are other optical means of the semiconductor laser unit 20C, may be provided with a coating. The first collimating lenses 21b, second collimating lens 21c, and condenser lens 26a constitute optical means for converging the laser light generated by the semiconductor laser 21a onto the welding area DA.

Operations of the resin welding apparatus 1F will now be explained with reference to FIGS. 14, 16 to 20, and 23.

First, the lower resin member DR and upper resin member UR are stacked on each other and set to a predetermined position of the base plate 11. Then, in the resin welding apparatus 1F, the pressure applying unit 10 applies a pressure between the lower resin member DR and upper resin member UR according to an instruction from the control unit 70. Also, in the resin welding apparatus 1F, the robot arm unit 60 moves the main unit 26 of the semiconductor laser unit 20C and the like to their initial positions according to an instruction from the control unit 70. Then, in the resin welding apparatus 1C, the semiconductor laser unit 20C emits laser beams LB such that the welding temperature falls within a reference temperature range according to an instruction from the control unit 70.

Here, the semiconductor laser unit 20C generates not only the laser beams LB having the oscillation wavelength, but also the light beams AB other than the oscillation wavelength. However, in the semiconductor laser unit 20C, the coating 26b of the condenser lens 26a blocks the light beams AB1 within a partial wavelength range of the light beams AB other than the oscillation wavelength. Therefore, the laser beams LB having the oscillation wavelength transmitted through the coating 26b, pressure plate 12, and upper resin member UR and the coating-transmitted light beams AB2 other than the oscillation wavelength reach the welding area DA of the lower resin member DR (see FIG. 17).

The laser beams LB having reached the welding area DA are absorbed thereby, whereby the welding area DA is heated and melted. This heat further heats and melts the welding area UA of the upper resin member UR, whereby the upper resin member UR and lower resin member DR are welded together. Here, the welding areas DA, UA generate thermally radiating beams RB and partly reflect the laser beams LB and coating-transmitted light beams AB2 other than the oscillation wavelength (see FIG. 18).

Then, in the resin temperature measuring unit 50C, the thermally radiating beams RB, laser beams LB, and coating-transmitted light beams FB2 other than the oscillation wavelength reach the light-collecting part 51, and are transmitted through the optical fiber 52 to the temperature detecting part 54. In the temperature detecting part 54, the bandpass filter 54a blocks the laser beams LB, coating-transmitted light beams AB2 other than the oscillation wavelength, and a part of the thermally radiating beams RB, so that only the bandpass-filter-transmitted thermally radiating beams RB1 are transmitted therethrough. Namely, the bandpass filter 54a removes light to become noises.

Therefore, the temperature detecting part 54 detects a stable welding temperature with a high accuracy according to the bandpass-filter-transmitted thermally radiating beams RB1 alone. Then, according to the welding temperature with a high accuracy, the control unit 70 controls irradiation conditions (intensity, focus diameter, etc.) of the semiconductor laser unit 20C, the focal position of the laser beams LB set by the robot arm unit 60, the welding speed, etc. Also, according to the pressure detected by a pressure sensor (not depicted), the control unit 70 controls the pressure between the resin members DR, UR caused by the pressure applying unit 10. The resin welding apparatus 1F emits the laser beams LB and applies a pressure between the resin members DR, UR according to thus controlled irradiation conditions, focal position, welding speed, pressure, etc., thereby performing stable welding at a pressure within the reference pressure range and a welding temperature within the reference temperature range, while changing the welding position.

In the resin welding apparatus 1F in accordance with the sixth embodiment, light beams within a partial wavelength range of the light beams AB other than the oscillation wavelength, which become noise light when detecting the welding temperature, are removed by the coating 26b applied to the condenser lens 26a before being made incident on the welding area DA, whereby the resin temperature measuring unit 50C can detect the welding temperature with a high accuracy. Therefore, the resin welding apparatus 1F stabilizes the control of the welding temperature, and lowers the ratio of defective welding. Also, since the coating 26b usually applied to the optical means of the semiconductor laser unit 20C partly cuts the light beams AB other than the oscillation wavelength, the resin welding apparatus 1F does not separately need a cut filter or the like. Therefore, the resin welding apparatus 1F can improve the accuracy in detecting the welding temperature at low cost.

Though embodiments in accordance with the present invention are explained in the foregoing, the present invention may be carried out in various modes without being restricted to the above-mentioned embodiments.

For example, though the present invention is employed in welding resin members to each other in a stacked fashion, it may be employed in other types of resin welding such as welding of resin members to each other in a butting fashion, and in processing such as piercing and cutting other than the welding.

Though a first cut filter for blocking noise light is disposed on the outside of the semiconductor laser unit in order to block the fluorescence generated by all the lenses in the optical means of the semiconductor laser unit in the first to third embodiments, wavelength characteristics of florescence of individual lenses in the optical means may be investigated, a first cut filter for blocking the wavelength range of the fluorescence of a specific lens in the optical means may be disposed closer to the welding area than is the specific lens, and the observation wavelength used in the resin temperature measuring apparatus may be set within the wavelength range blocked by the first cut filter. When fluorescence wavelength ranges overlap among a plurality of lenses, the first cut filter is required to be disposed nearer to the welding area than are the plurality of lenses having the wavelengths overlapping each other.

Though the first cut filter is constructed as a filter which totally blocks the noise light in the above-mentioned embodiments, it may be a filter which blocks only the light within the observation wavelength range of 1100 nm to 2800 nm, or a filter which blocks only light components having a single observation wavelength or a plurality of observation wavelengths used in the resin temperature measuring apparatus.

Though the first and second collimating lenses are used in the semiconductor laser units in the above-mentioned embodiments, other lenses such as ball lenses may be used as well.

Though the coating applied to the condenser lens blocks light in a partial wavelength range of fluorescence in the third and sixth embodiment, means other than the coating applied to optical means of the semiconductor laser units, e.g., transmission characteristics of optical lenses, may be used for blocking the fluorescence. Also, a fiber-out type configuration may be used instead of the direct focusing type.

INDUSTRIAL APPLICABILITY

In the present invention, a light component having a wavelength to become an observation wavelength for detecting the processing temperature in light generated by an optical system is blocked before processing, whereby no noise light mingles into thermally radiating light having the observation wavelength when detecting the processing temperature. Therefore, the processing temperature can be detected with a high accuracy, and stable processing temperature control can reduce defective processing.

The invention claimed is:

1. A laser processing apparatus for welding stacked resin members to each other by using laser light, the apparatus comprising:
   a semiconductor laser for generating laser light; and
   a filter, disposed between the semiconductor laser and the resin members, for blocking light having a wavelength that is other than an oscillation wavelength of the semiconductor laser wherein said blocked light becomes an observation wavelength for measuring a temperature of a welding area in the light generated by the semiconductor laser;
   one of the stacked resin members, on the incident side of the laser light generated by the semiconductor laser, having a property of transmitting the laser light that is generated by the semiconductor laser and the thermally radiating light that is generated by the welding area;
   the filter blocks the light that is generated by the semiconductor laser and that has a wavelength other than an oscillation wavelength of the semiconductor laser, and said light having a wavelength falling within the range of 1500 nm to 2800 nm which can be transmitted through the resin member on the incident side of the laser light;
   wherein the light that is generated by the semiconductor laser and has a wavelength that cannot be blocked by the filter is used for welding the resin members to each other, and said thermally radiating light that is generated by the welding area and has a wavelength that does not pass through said filter, said thermally radiating light is used for measuring the temperature of the welding area.

2. A laser processing apparatus for welding stacked resin members to each other by using laser light, the apparatus comprising:
   a semiconductor laser for generating laser light; and
   optical means for converging the laser light generated by the semiconductor laser onto a welding area and blocking light having a wavelength that is other than an oscillation wavelength of the semiconductor laser wherein said blocked light becomes an observation wavelength for measuring a temperature of the welding area in the light generated by the semiconductor laser;
   one of the stacked resin members, on the incident side of the laser light generated by the semiconductor laser, having a property of transmitting the laser light that is generated by the semiconductor laser and the thermally radiating light that is generated by the welding area;
   optical means blocks the light that is generated by the semiconductor laser and that has a wavelength other than an oscillation wavelength of the semiconductor laser, and said light having a wavelength falling within the range of 1500 nm to 2800 nm which can be transmitted through the resin member on the incident side of the laser light;

wherein the light that is generated by the semiconductor laser and has a wavelength that cannot be blocked by optical means is used for welding the resin members to each other, and said thermally radiating light that is generated by the welding area and has a wavelength that does not pass through said optical means, said thermally radiating light is used for measuring the temperature of the welding area.

3. A laser processing method for welding stacked resin members to each other by using laser light, the method comprising:

a laser light generating step of causing a semiconductor laser to generate laser light; and a filtering step of blocking light having a wavelength that is other than an oscillation wavelength of the semiconductor laser wherein said blocked light becomes an observation wavelength for measuring a temperature of a welding area in the light generated by the laser light generating step with a filter before welding;

one of the stacked resin members, on the incident side of the laser light generated by the laser light generating step, having a property of transmitting the laser light that is generated by the laser light generating step and the thermally radiating light that is generated by the welding area;

the filtering step blocks the light that is generated by the laser light generating step and that has a wavelength other than an oscillation wavelength of the semiconductor laser, and said light having a wavelength falling within the range of 1500 nm to 2800 nm which can be transmitted through the resin member on the incident side of the laser light;

wherein the light that is generated by the laser light generating step and has a wavelength that cannot be blocked by the filtering step is used for welding the resin members to each other, and said thermally radiating light that is generated by the welding area and has a wavelength that does not pass through said filtering step, said thermally radiating light is used for measuring the temperature of the welding area.

4. A laser processing method for welding stacked resin members to each other by using laser light, the method comprising:

a laser light generating step of causing a semiconductor laser to generate laser light; and a filtering step of blocking light having a wavelength that is other than an oscillation wavelength of the semiconductor laser wherein said blocked light becomes an observation wavelength for measuring a temperature of a welding area in the light generated by the laser light generating step with an optical system adapted to converge the laser light generated by the laser light generating step onto the welding area;

one of the stacked resin members, on the incident side of the laser light generated by the laser light generating step, having a property of transmitting the laser light that is generated by the laser light generating step and the thermally radiating light that is generated by the welding area;

the filtering step blocks the light that is generated by the laser light generating step and that has a wavelength other than an oscillation wavelength of the semiconductor laser, and said light having a wavelength falling within the range of 1500 nm to 2800 nm which can be transmitted through the resin member on the incident side of the laser light;

wherein the light that is generated by the laser light generating step and has a wavelength that cannot be blocked by the filtering step is used for welding the resin members to each other, and said thermally radiating light that is generated by the welding area and has a wavelength that does not pass through said filtering step, said thermally radiating light is used for measuring the temperature of the welding area.

* * * * *